United States Patent
Ito

(10) Patent No.: US 11,221,528 B2
(45) Date of Patent: Jan. 11, 2022

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Higashihiroshima (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/121,710

(22) Filed: Dec. 14, 2020

(65) Prior Publication Data

US 2021/0181588 A1    Jun. 17, 2021

(30) Foreign Application Priority Data

Dec. 16, 2019  (JP) .............................. JP2019-226267

(51) Int. Cl.
   *G02F 1/1362*  (2006.01)
   *G02F 1/1365*  (2006.01)
   *G02F 1/1343*  (2006.01)

(52) U.S. Cl.
   CPC ...... *G02F 1/136209* (2013.01); *G02F 1/1365* (2013.01); *G02F 1/134309* (2013.01); *G02F 1/136286* (2013.01); *G02F 2201/123* (2013.01)

(58) Field of Classification Search
   None
   See application file for complete search history.

(56) References Cited

U.S. PATENT DOCUMENTS

| 9,671,634 | B2* | 6/2017 | Sato | G02F 1/133351 |
| 2004/0183086 | A1* | 9/2004 | Nakai | H01L 31/02325 |
| | | | | 257/98 |
| 2006/0209222 | A1* | 9/2006 | Yasuda | H01L 27/124 |
| | | | | 349/43 |
| 2009/0128720 | A1 | 5/2009 | Toriyama et al. | |
| 2011/0180798 | A1* | 7/2011 | Shim | G02F 1/13394 |
| | | | | 257/59 |
| 2014/0313448 | A1* | 10/2014 | Kinoe | G02F 1/136209 |
| | | | | 349/46 |

(Continued)

FOREIGN PATENT DOCUMENTS

| JP | 2005250234 | 9/2005 |
| JP | 2008225034 | 9/2008 |

(Continued)

*Primary Examiner* — Ryan Crockett
(74) *Attorney, Agent, or Firm* — JCIPRNET

(57) ABSTRACT

An electro-optical device includes a display region and a peripheral region, and includes a first substrate including a pixel electrode being disposed in the display region and having translucency, a transistor being disposed in the display region and being electrically coupled to the pixel electrode, a second substrate including a common electrode, and an electro-optical layer being arranged between the pixel electrode and the common electrode, wherein the first substrate or the second substrate includes a first layer having translucency and an insulating property, a second layer having translucency and an insulating property, and being disposed closer to the electro-optical layer than the first layer is, and a light shielding film being arranged between the first layer and the second layer and including tungsten, and the light shielding film includes a concave surface being in contact with the second layer.

16 Claims, 17 Drawing Sheets

(56) References Cited

U.S. PATENT DOCUMENTS

| | | | | |
|---|---|---|---|---|
| 2016/0306225 | A1* | 10/2016 | Zhang | H01L 27/1225 |
| 2018/0129108 | A1* | 5/2018 | Lee | G02F 1/136209 |
| 2018/0294360 | A1* | 10/2018 | Zhang | H01L 29/66969 |
| 2019/0137812 | A1* | 5/2019 | Han | G02F 1/133345 |
| 2019/0391424 | A1* | 12/2019 | Ito | G02F 1/133512 |
| 2019/0391453 | A1* | 12/2019 | Ito | G02F 1/1368 |
| 2021/0072589 | A1* | 3/2021 | Taguchi | G02F 1/133514 |

FOREIGN PATENT DOCUMENTS

| | | |
|---|---|---|
| JP | 2009128401 | 6/2009 |
| JP | 2011059374 | 3/2011 |
| JP | 2014215330 | 11/2014 |
| JP | 2019219531 | 12/2019 |

\* cited by examiner

ELECTRO-OPTICAL DEVICE AND ELECTRONIC APPARATUS

The present application is based on, and claims priority from JP Application Serial Number 2019-226267, filed Dec. 16, 2019, the disclosure of which is hereby incorporated by reference herein in its entirety.

BACKGROUND

1. Technical Field

The present disclosure relates to an electro-optical device and an electronic apparatus.

2. Related Art

An electro-optical device such as a liquid crystal device is used in an electronic apparatus such as a projector. JP-A-2005-250234 discloses an electro-optical device including an element substrate, a counter substrate, and liquid crystal arranged between the element substrate and the counter substrate.

The element substrate described in JP-A-2005-250234 includes a quartz substrate, a plurality of pixel electrodes arranged in a matrix shape, and Thin Film Transistors (TFTs) provided correspondingly to the pixel electrodes. Further, the element substrate described in JP-A-2005-250234 includes a light shielding film constituted of metal or the like for the purpose of suppressing incidence of light into the TFTs.

With regard to the light shielding film described in JP-A-2005-250234, it is considered that the light shielding film is increased in thickness in order to improve a light shielding property. However, when the thickness of the light shielding film is evenly increased in the element substrate described in JP-A-2005-250234, a stress force generated to a base material is excessively large. As a result, a defect such as warpage of the base material and peeling of the light shielding film is disadvantageously caused. Thus, the related-art element substrate has difficulties in improving a light shielding property of the light shielding film while suppressing such defect, which causes a problem.

SUMMARY

An electro-optical device according to one aspect of the present disclosure is an electro-optical device including a display region and a peripheral region positioned outside of the display region in plan view, and includes a first substrate including a pixel electrode being present in the display region and having translucency, a transistor being present in the display region and being electrically coupled to the pixel electrode, and a circuit configured to drive the transistor, the circuit being present in the peripheral region, a second substrate including a common electrode, and an electro-optical layer being arranged between the pixel electrode and the common electrode, and having optical characteristics varying in accordance with an electric field, wherein the first substrate or the second substrate include a first layer having translucency and an insulating property, a second layer having translucency and an insulating property, being in contact with the first layer, and being present closer to the electro-optical layer than the first layer is, and a light shielding film being arranged between the first layer and the second layer and including tungsten, and the light shielding film includes a concave surface being in contact with the second layer.

An electronic apparatus according to one aspect of the present disclosure includes the electro-optical device and a control unit configured to control an operation of the electro-optical device.

DESCRIPTION OF EXEMPLARY EMBODIMENTS

Figure 1:
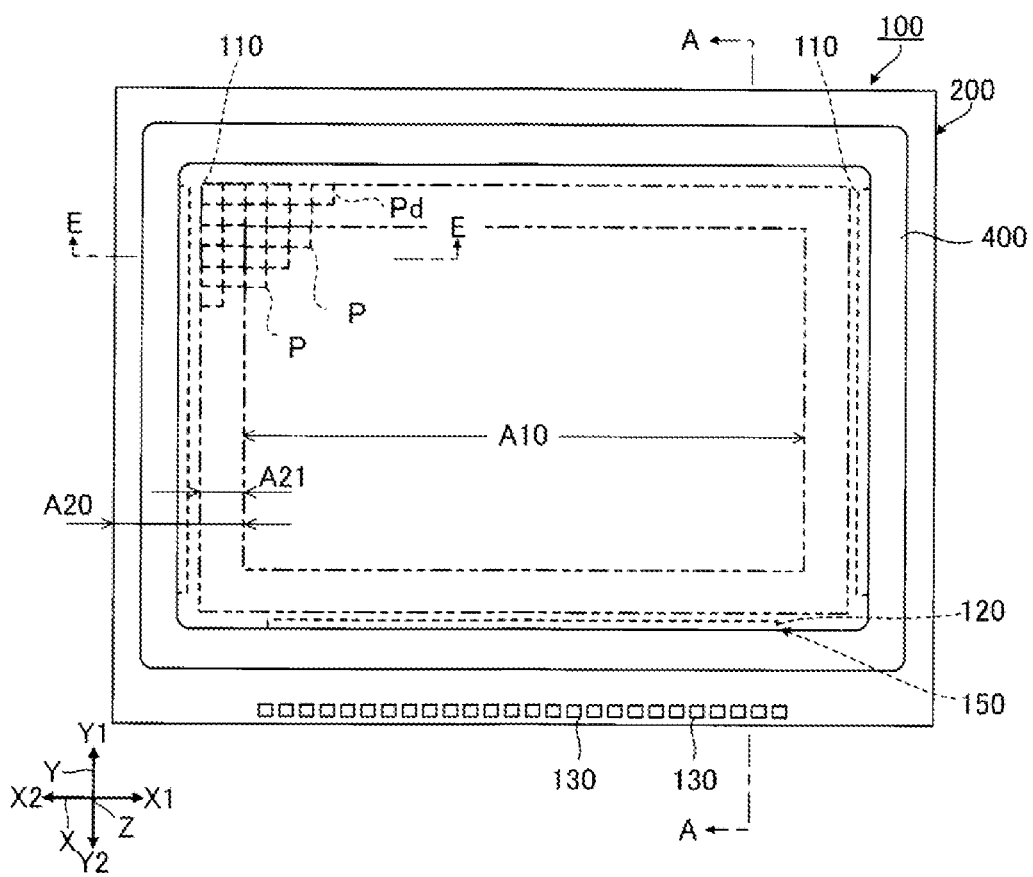
FIG. 1 is a plan view of an electro-optical device according to a first exemplary embodiment.

Preferred embodiments of the present disclosure will be described below with reference to the accompanying drawings. Note that, in the drawings, dimensions and scales of sections are different from actual dimensions and scales as appropriate, and some of the sections are schematically illustrated for easy understanding. Further, the scope of the present disclosure is not limited to these embodiments unless otherwise stated to limit the present disclosure in the following descriptions. Further, the expression "element A and element B are equivalent to each other" described in the present specification indicates that element A and element B are substantially equivalent to each other, and allows manufacturing errors.

1. Electro-optical Device

1A. First Exemplary Embodiment

1A-1. Basic Configuration

Figure 2:
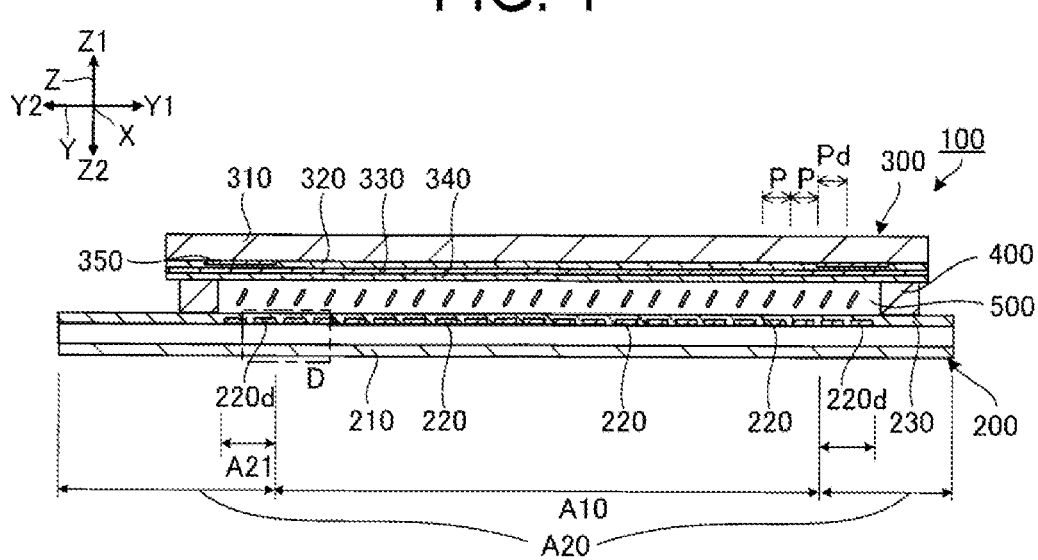
FIG. 2 is a view illustrating a cross-sectional surface taken along the line A-A illustrated in FIG. 1.

FIG. 1 is a plan view of an electro-optical device 100 according to a first exemplary embodiment. FIG. 2 is a view illustrating a cross-sectional surface taken along the line A-A illustrated in FIG. 1. Note that, in FIG. 1, a counter substrate 300 is omitted in illustration. Further, the description will be made below by appropriately using an X axis, a Y axis, and a Z axis that are orthogonal to each other are used for convenience of explanation. Further, one direction along the X axis corresponds to an X1 direction, and a direction opposite to the X1 direction corresponds to an X2 direction. Similarly, one direction along the Y axis corresponds to a Y1 direction, and a direction opposite to the Y1 direction corresponds to a Y2 direction. One direction along the Z axis corresponds to a Z1 direction, and a direction opposite to the Z1 direction corresponds to a Z2 direction.

The electro-optical device 100 illustrated in FIG. 1 and FIG. 2 is a transmissive liquid crystal device of an active matrix drive type. As illustrated in FIG. 2, the electro-optical device 100 includes an element substrate 200 having translucency, the counter substrate 300 having translucency, a sealing member 400 having a frame shape, and a liquid crystal layer 500. The sealing member 400 is arranged between the element substrate 200 and the counter substrate 300. The liquid crystal layer 500 is arranged in a region surrounded by the element substrate 200, the counter substrate 300, and the sealing member 400. The element substrate 200 is an example of a "first substrate", the counter substrate 300 is an example of a "second substrate", and the liquid crystal layer 500 is an example of an "electro-optical layer".

As illustrated in FIG. 2, the element substrate 200, the liquid crystal layer 500, and the counter substrate 300 are arrayed along the Z axis. A surface of a first base member 210, which is described later, included in the element substrate 200 is parallel to an X-Y plane. In the following description, viewing in the Z1 direction or the Z2 direction is referred to as a "plan view". Further, a direction in which the element substrate 200, the liquid crystal layer 500, and the counter substrate 300 overlap one another is parallel to the Z1 direction or the Z2 direction.

In the electro-optical device 100 according to the present exemplary embodiment, for example, light emitted from a light source enters the element substrate 200, passes through the liquid crystal layer 500, and is emitted from the counter substrate 300. Note that the light may enter the counter substrate 300, may pass through the liquid crystal layer 500, and may be emitted from the element substrate 200. Further, the light is visible light. "Translucency" indicates transparency to visible light, and preferably indicates that a transmittance of visible light is greater than or equal to 50%. A light shielding property indicates a light shielding property to visible light, and preferably indicates that a transmittance of visible light is less than 50%, more preferably, less than or equal to 10%. Further, the electro-optical device 100 illustrated in FIG. 1 has a rectangular shape in plan view. However, the shape the electro-optical device 100 in plan view is not limited thereto, and may be a circular shape and the like, for example.

As illustrated in FIG. 2, the element substrate 200 includes the first base member 210, a plurality of pixel electrodes 220, a plurality of dummy pixel electrodes 220d, and a first alignment film 230. The first base member 210 is constituted of a flat plate having translucency and an insulating property. Each of the plurality of pixel electrodes 220 and the plurality of dummy pixel electrodes 220d has translucency, and is constituted of a transparent conductive material of Indium Tin Oxide (ITO), Indium Zinc Oxide (IZO), or the like, for example. The first alignment film 230 is positioned in the element substrate 200 on a side closest to the liquid crystal layer 500, and aligns liquid crystal molecules of the liquid crystal layer 500. Examples of the constituent material of the first alignment film 230 include polyimide, silicon oxide, and the like. Note that, a detailed configuration of the element substrate 200 will be described later.

As illustrated in FIG. 2, the counter substrate 300 includes a second base member 310, an insulating layer 320, a common electrode 330, a second alignment film 340, and a partition 350. The second base member 310, the insulating layer 320, the common electrode 330, and the second alignment film 340 are arrayed in the stated order. Among those elements, the second alignment film 340 is positioned on the side closest to the liquid crystal layer 500. The second base member 310 is constituted of a flat plate having translucency and an insulating property. The second base member 310 is constituted of, for example, glass, quartz, or the like. The insulating layer 320 is constituted of a silicon-based inorganic material, such as silicon oxide, having translucency and an insulating property. The partition 350 having a frame shape is arranged in the insulating layer 320. The partition 350 is constituted of a metal material or the like having a light shielding property. The common electrode 330 is constituted of a transparent conductive material of ITO, IZO, or the like, for example. Further, the second alignment film 340 aligns the liquid crystal molecules of the liquid crystal layer 500. Examples of the constituent material of the second alignment film 340 include polyimide, silicon oxide, and the like.

The sealing member 400 is a frame-like member formed by using an adhesive containing various types of curable resins such as epoxy resin, for example. The sealing member 400 may contain a gap material. The gap material is, for example, fiber constituted of an inorganic material such as glass or a bead constituted of an inorganic material such as glass. The sealing member 400 is fixed to each of the element substrate 200 and the counter substrate 300.

The liquid crystal layer 500 is arranged between the plurality of pixel electrodes 220 and the common electrode 330, and has optical characteristics varying in accordance with an electric field. More specifically, the liquid crystal layer 500 contains liquid crystal molecules having positive or negative dielectric anisotropy. The liquid crystal layer 500 is interposed between the element substrate 200 and the counter substrate 300 in such a way that the liquid crystal molecules are held in contact with both the first alignment film 230 and the second alignment film 340. The alignment of the liquid crystal molecules contained in the liquid crystal layer 500 varies in accordance with a voltage applied to the liquid crystal layer 500.

As illustrated in FIG. 1, a driving circuit 150 and a plurality of external terminals 130 are arranged on the element substrate 200. The driving circuit 150 is an example of a "circuit", and includes a plurality of scanning line driving circuits 110 and a signal line driving circuit 120. A lead wiring line, which is not illustrated, is led from the scanning line driving circuit 110 or the signal line driving circuit 120, and is coupled to each of the external terminals 130. The driving circuit 150 supplies various signals to a plurality of transistors 23 illustrated in FIG. 3, which are described later, and thus drives each of the transistors 23.

The electro-optical device 100 having the configuration described above includes a display region A10 for displaying an image and a peripheral region A20. The peripheral region A20 is positioned outside of the display region A10 in plan view, and surrounds the display region A10. The display region A10 includes a plurality of pixels P arrayed in a matrix shape. The plurality of pixel electrodes 220 are arranged in the display region A10. The plurality of pixel electrodes 220 are arranged for the plurality of pixels P in a one-on-one manner. The partition 350 described above surrounds the display region A10 in plan view. The partition 350 prevents unnecessary stray light from entering the display region A10. Further, the peripheral region A20 includes a dummy pixel region A21. The dummy pixel region A21 includes a plurality of dummy pixels Pd arrayed in a frame shape having two rows and two lines. The dummy pixel region A21 surrounds the display region A10 in plan view. Note that the array of the plurality of dummy pixels Pd is not limited to two rows and two lines, but may be freely selected. The plurality of dummy pixel electrodes 220*d* are arranged for the plurality of dummy pixels Pd in a one-on-one manner. Further, the configuration of the dummy pixel Pd is the same as the configuration of the pixel P.

1A-2. Electrical Configuration of Element Substrate 200

Figure 3:
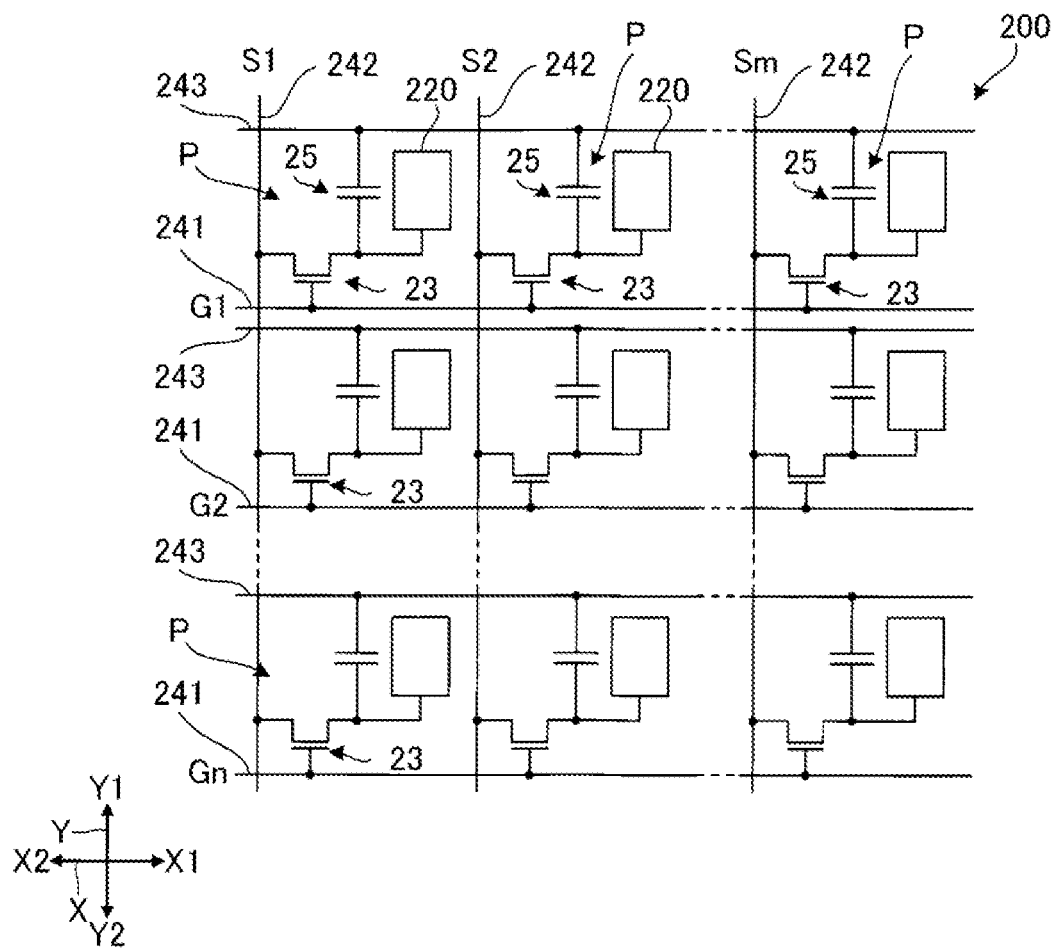
FIG. 3 is an equivalent circuit diagram illustrating an electrical configuration of an element substrate.

FIG. 3 is an equivalent circuit diagram illustrating an electrical configuration of the element substrate 200. As illustrated in FIG. 3, the element substrate 200 includes n pieces of scanning lines 241, m pieces of signal lines 242, and n pieces of first constant potential lines 243. Each of n and m is an integer of 2 or greater. The transistor 23 is arranged correspondingly to each of the intersections between the n pieces of scanning lines 241 and the m pieces of signal lines 242. Each of the transistors 23 is a TFT functioning as a switching element, for example. Each of the transistors 23 includes a gate, a source, and a drain.

Each of the n pieces of scanning lines 241 extends along the X axis, and the n pieces of scanning lines 241 are arrayed at an equal interval along the Y axis. Each of the n pieces of scanning lines 241 is electrically coupled to each of gates of some transistors 23 among all the transistors 23. The n pieces of scanning lines 241 are electrically coupled to the scanning line driving circuit 110 illustrated in FIG. 1. Scanning signals G1, G2, . . . , and Gn are line-sequentially supplied from the scanning line driving circuit 110 to the first scanning line 241 to the n-th scanning line 241.

Each of the m pieces of signal lines 242 illustrated in FIG. 3 extends along the Y axis, and the m pieces of signal lines 242 are arrayed at an equal interval along the X axis. Each of the m pieces of signal lines 242 is electrically coupled to each of sources of some transistors 23 among all the transistors 23. The m pieces of signal lines 242 are electrically coupled to the signal line driving circuit 120 illustrated in FIG. 1. Image signals S1, S2, . . . , and Sm are parallelly supplied from the signal line driving circuit 120 to the first signal line 242 to the m-th signal line 242.

The n pieces of scanning lines 241 and the m pieces of signal lines 242 illustrated in FIG. 3 are electrically insulated from each other, and are arranged in a lattice-like pattern in plan view. A region surrounded by two adjacent scanning lines 241 and two adjacent signal lines 242 corresponds to the pixel P. Each of the pixel electrodes 220 is electrically coupled to the corresponding transistor 23.

Each of the n pieces of first constant potential lines 243 extends along the X axis, and the n pieces of first constant potential lines 243 are arrayed at an equal interval along the Y axis. Further, the n pieces of first constant potential lines 243 are electrically insulated from the m pieces of signal lines 242 and the n pieces of scanning lines 241, and are arranged at an interval from those lines. A fixed potential such as a ground potential is applied to each of the first constant potential lines 243. Each of the n pieces of first constant potential lines 243 is electrically coupled to some capacitors 25 among all the capacitors 25. Each of the first constant potential lines 243 is a capacitance line electrically coupled to the capacitor 25. The plurality of capacitors 25 is electrically coupled to the plurality of pixel electrodes 220 in a one-on-one manner. Further, the plurality of capacitors 25 are electrically coupled to the drains of the plurality of transistors 23 in a one-on-one manner. Each of the capacitors 25 is a capacitance element that holds a potential of the pixel electrode 220.

When the scanning signals G1, G2, . . . , and Gn are sequentially active, and the n pieces of scanning lines 241 are sequentially selected, the transistor 23 coupled to the selected scanning line 241 is turned to an on state. Then, the image signals S1, S2, . . . , and Sm having magnitudes corresponding to a grayscale to be displayed are transmitted, via the m pieces of data lines 242, to the pixel P corresponding to the selected scanning line 241, and are then applied to the pixel electrodes 220. With this, a voltage corresponding to the grayscale to be displayed is applied to a liquid crystal capacitor formed between the pixel electrode 220 and the common electrode 330 of the counter substrate 300 illustrated in FIG. 2, and the alignment of the liquid crystal molecules varies in accordance with the applied voltage. Further, the applied voltage is held by the capacitor 25. Such variation in the alignment of the liquid crystal molecules modulates light, and enables grayscale display.

Further, a constant potential is applied to the dummy pixel electrode 220*d* illustrated in FIG. 2, which is described above. The constant potential is a potential for black display in a case where, for example, the electro-optical device 100 is in a normally-black mode. With this, the dummy pixel region A21 can be caused to function as an electronic partition.

1A-3. Element Substrate 200

Figure 4:
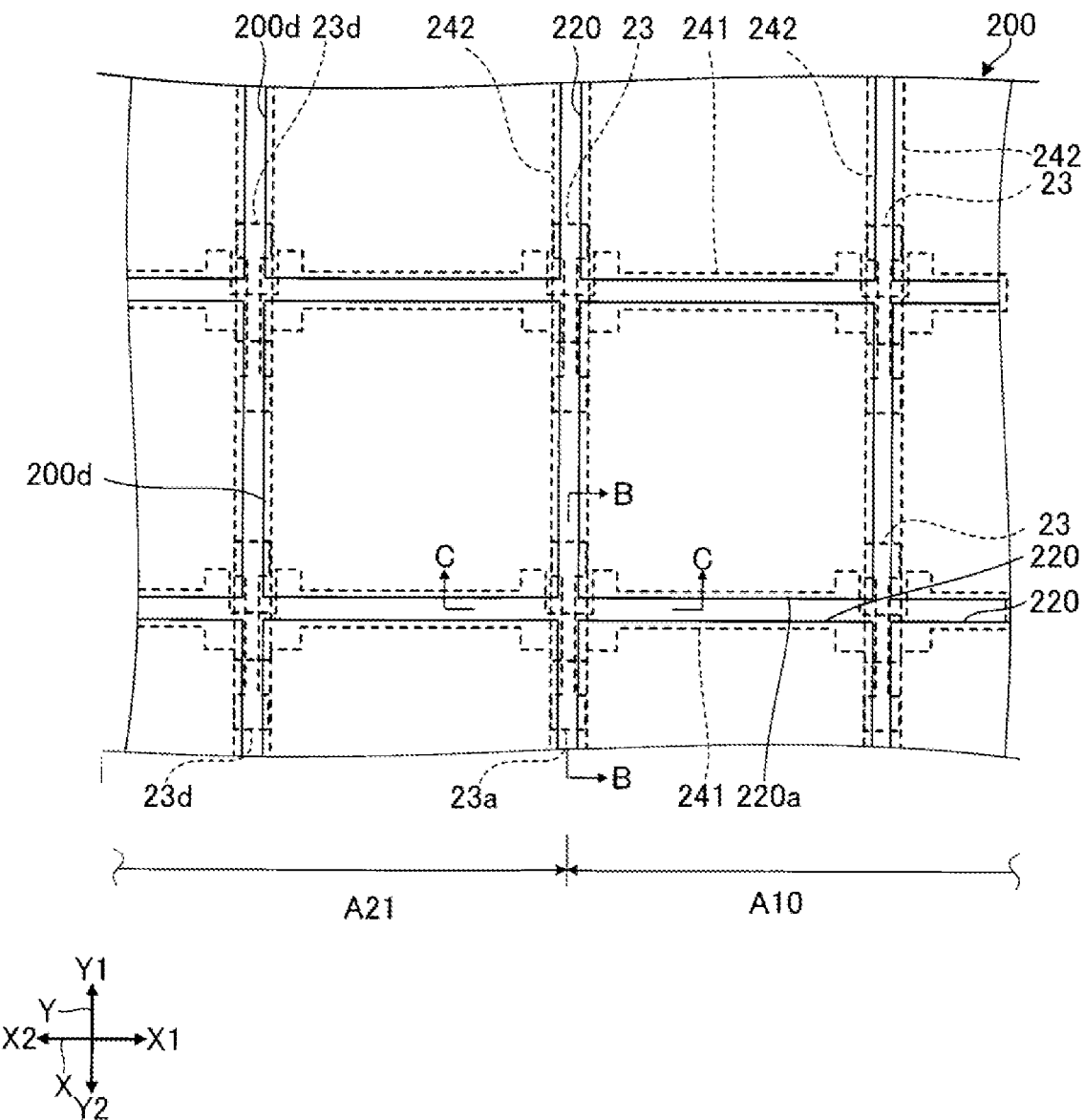
FIG. 4 is a plan view illustrating a part of the element substrate.

FIG. 4 is a plan view illustrating a part of the element substrate 200. FIG. 4 corresponds to a view in which a region D in FIG. 2 is enlarged. Note that, in FIG. 4, the first alignment film 230 is omitted in illustration.

As illustrated in FIG. 4, each of the shapes of the plurality of pixel electrodes 220 is substantially rectangular in plan view. The plurality of pixel electrodes 220 are arranged in a matrix shape correspondingly to the pixels P described above in plan view. Further, the transistors 23 electrically coupled to the pixel electrodes 220 are arranged in the display region A10, similarly to the pixel electrodes 220. Each of the transistors 23 is arranged at an intersecting position of the scanning line 241 and the signal line 242. The plurality of transistors 23 are arranged for the plurality of pixel electrodes 220 in a one-on-one manner. For example, one freely-selected transistor 23a among the plurality of transistors 23 is arranged correspondingly to one freely-selected pixel electrode 220a among the plurality of pixel electrodes 220. Note that, in the following description, the freely-selected transistor 23a among the plurality of transistors 23 and relevant elements are mainly described.

As illustrated in FIG. 4, each of the shapes of the plurality of dummy pixel electrodes 220d is substantially rectangular in plan view. Although not illustrated, the plurality of dummy pixel electrodes 220d are arranged in two rows and two lines correspondingly to the dummy pixels Pd described above in plan view. Further, the transistors 23d electrically coupled to the dummy pixel electrodes 220d are arranged in the dummy pixel region A21, similarly to the dummy pixel electrodes 220d.

Figure 5:
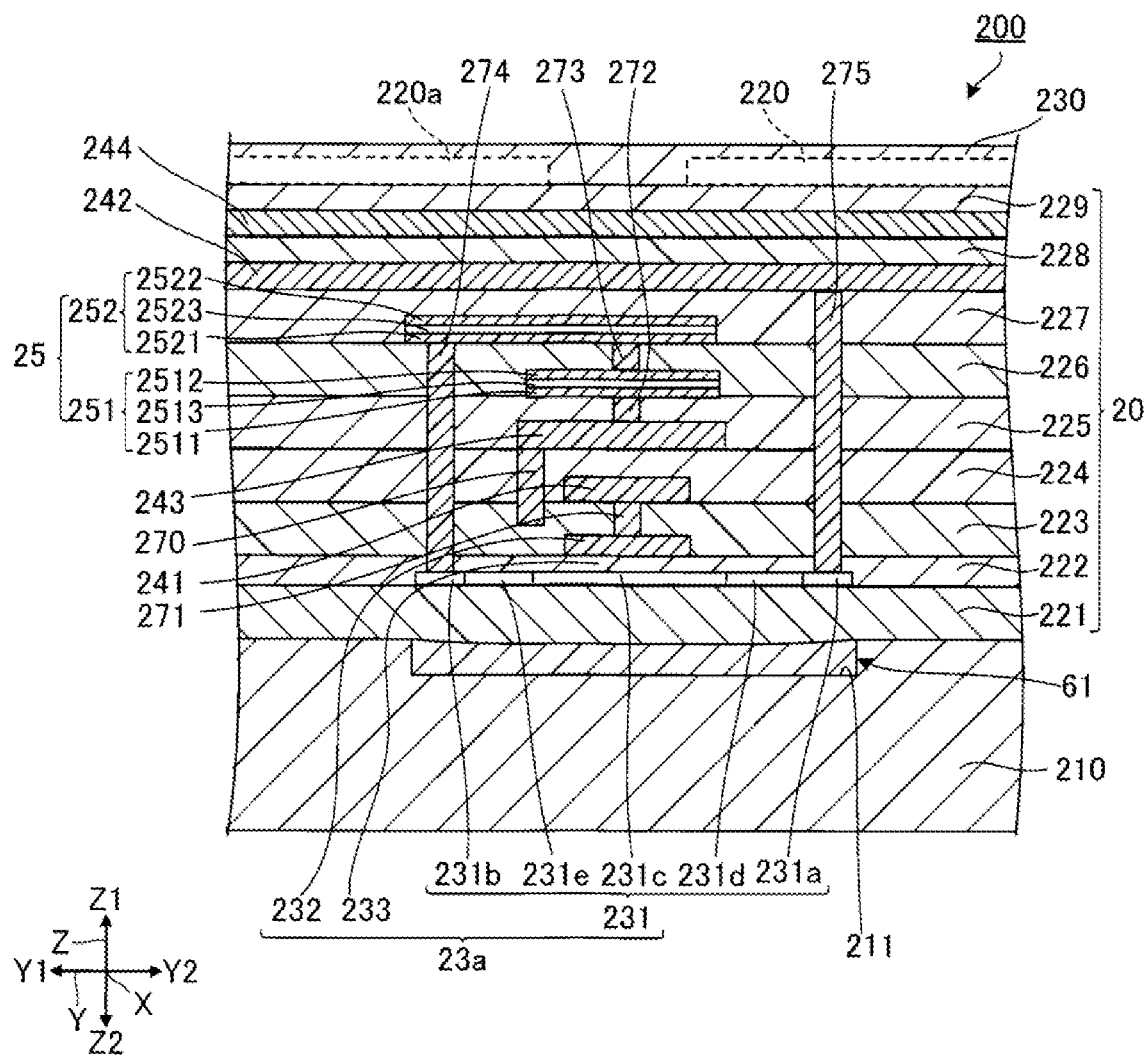
FIG. 5 is a view illustrating a cross-sectional surface taken along the line B-B in FIG. 4.
Figure 6:
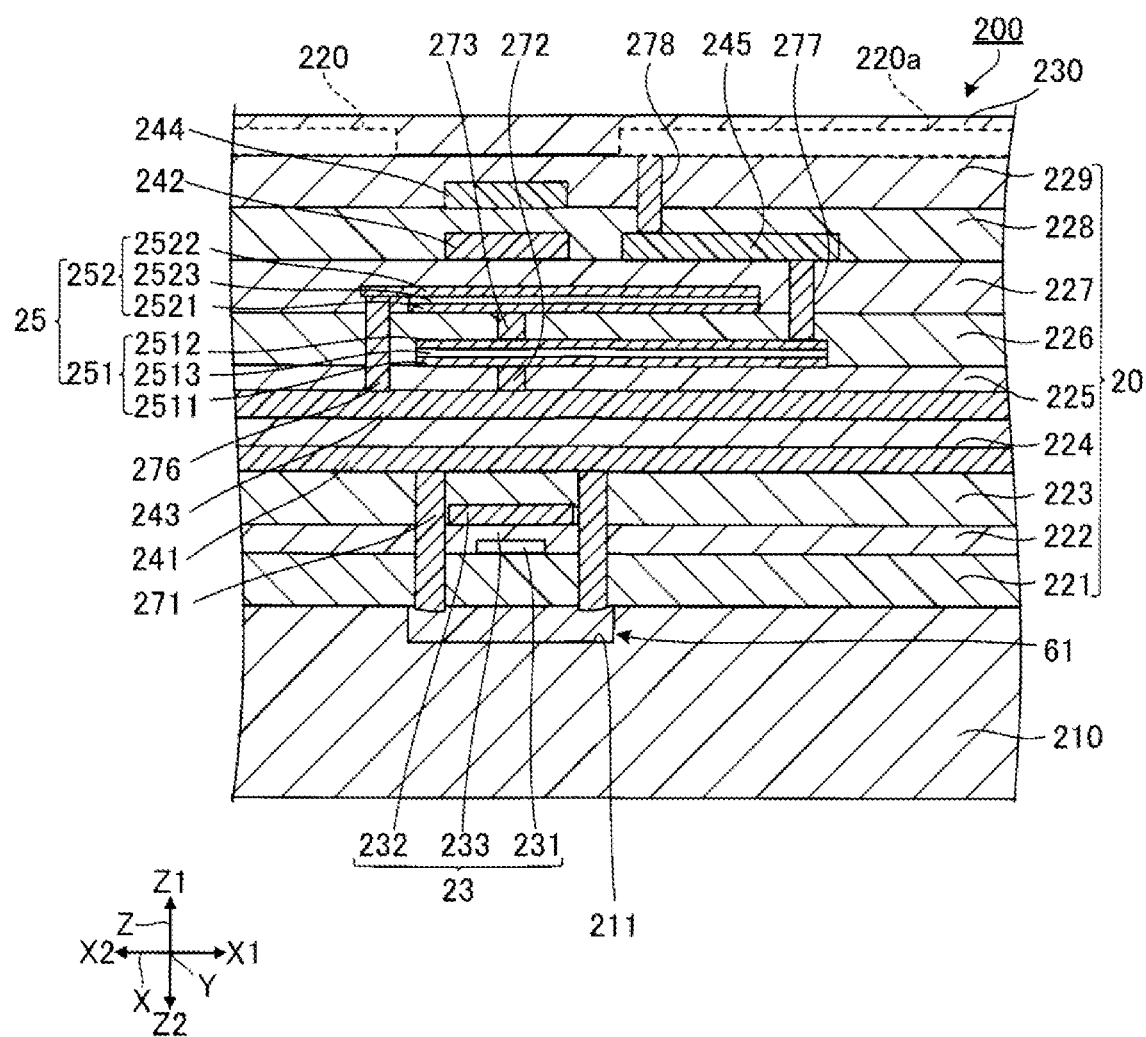
FIG. 6 is a view illustrating a cross-sectional surface taken along the line C-C in FIG. 4.

FIG. 5 is a view illustrating a cross-sectional surface taken along the line B-B in FIG. 4. FIG. 6 is a view illustrating a cross-sectional surface taken along the line C-C in FIG. 4. In the following description, the Z1 direction corresponds to an upper side, and the Z2 direction corresponds to a lower side. Further, in the following description, the element substrate 200 will be described with reference to FIG. 7 and FIG. 8 described later in addition to FIG. 5 and FIG. 6.

As illustrated in FIG. 5 and FIG. 6, the element substrate 200 includes a layered body 20 in addition to the first base member 210, the plurality of pixel electrodes 220, and the first alignment film 230 described above. The first base member 210, the layered body 20, the plurality of pixel electrodes 220, and the first alignment film 230 are layered in the stated order. In the present exemplary embodiment, the first base member 210 corresponds to a "first layer".

The first base member 210 includes a recessed portion 211. The recessed portion 211 is a recess formed in the first base member 210. Note that the recessed portion 211 is present for each of the transistors 23. As illustrated in FIG. 5 and FIG. 6, a light shielding film 61 is arranged in the recessed portion 211. The light shielding film 61 shields the transistor 23 from incident light. The light shielding film 61 shields the transistor 23 from incident light, and thus instability of a switching operation of the transistor 23 is suppressed. The light shielding film 61 will be described later in detail.

The layered body 20 covering the light shielding film 61 is arranged on the first base member 210. The layered body 20 has translucency and an insulating property. The layered body 20 includes a plurality of insulating layers 221, 222, 223, 224, 225, 226, 227, 228, and 229. In the present exemplary embodiment, the insulating layer 221 corresponds to a "second layer". The plurality of insulating layers 221, 222, 223, 224, 225, 226, 227, 228, and 229 are layered in the stated order in a direction away from the first base member 210. Each of the plurality of insulating layers 221 to 229 has translucency and an insulating property, and is constituted of, for example, an inorganic material, such as silicon, including oxide silicon or the like. Each of the plurality of insulating layers 221 to 229 is formed by, for example, thermal oxidation, a chemical vapor deposition (CVD) method, or the like. Further, the insulating layer 229 contacts with the pixel electrode 220a. The insulating layer 229 may include a layer constituted of, for example, glass such as borosilicate glass (BSG) or the like.

As illustrated in FIG. 5 and FIG. 6, the scanning line 241, the signal line 242, the first constant potential line 243, the capacitor 25, the transistor 23a, a relay electrode 245, and the second constant potential line 244 are arranged in the layered body 20. Further, a first conduction portion 271, a second conduction portion 272, a third conduction portion 273, a fourth conduction portion 274, a fifth conduction portion 275, a sixth conduction portion 276, a seventh conduction portion 277, an eighth conduction portion 278, and a shielding portion 270 are arranged in the layered body 20. The first conduction portion 271 is an example of a "contact portion".

As illustrated in FIG. 5 and FIG. 6, the insulating layer 221 is present on the first base member 210. Thus, the insulating layer 221 is present closer to the liquid crystal layer 500 described above than the first base member 210 is. Further, the insulating layer 221 contacts with the first base member 210. The transistor 23 is arranged on the insulating layer 221. The transistor 23 includes a semiconductor layer 231, a gate electrode 232, and a gate insulating layer 233. The semiconductor layer 231 is arranged between the insulating layer 221 and the insulating layer 222. The gate electrode 232 is arranged between the insulating layer 222 and the insulating layer 223. The gate insulating layer 233 is interposed between the gate electrode 232 and a channel region 231c.

As illustrated in FIG. 5, the semiconductor layer 231 includes a source region 231a, a drain region 231b, the channel region 231c, a first Lightly Doped Drain (LDD) region 231d, and a second LDD region 231e. The channel region 231c is arranged between the source region 231a and the drain region 231b. The first LDD region 231d is positioned between the channel region 231c and the source region 231a. The second LDD region 231e is positioned between the channel region 231c and the drain region 231b. For example, the semiconductor layer 231 is formed by forming polysilicon into a film, and a region except for the channel region 231c is doped with impurities for enhancing conductivity. An impurity concentration of the first LDD region 231d and the second LDD region 231e is lower than an impurity concentration of the source region 231a and the drain region 231b. Note that at least one of the first LDD region 231d and the second LDD region 231e, particularly, the first LDD region 231d may be omitted.

Figure 7:
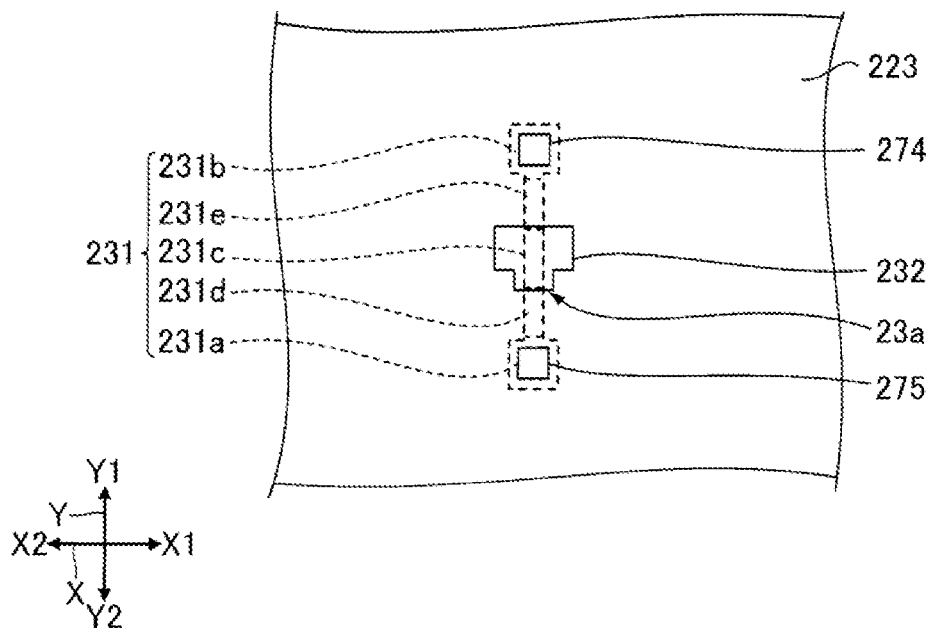
FIG. 7 is a plan view illustrating a transistor included in the element substrate.

FIG. 7 is a plan view illustrating the transistor 23a included in the element substrate 200. As illustrated in FIG. 7, the gate electrode 232 overlaps the channel region 231c of the semiconductor layer 231 in plan view. Further, for example, the gate electrode 232 is formed by doping polysilicon with impurities for enhancing conductivity. Note that the gate electrode 232 may be formed through use of a material having conductivity, such as metal, metal silicide, and a metal compound. Further, the gate insulating layer 233 illustrated in FIG. 5 is constituted of, for example, silicon oxide that is formed into a film by thermal oxidation, the CVD method, or the like.

As illustrated in FIG. 5, the scanning line 241 is arranged between the insulating layer 223 and the insulating layer 224. The insulating layer 223 is arranged in the first conduction portion 271. The scanning line 241 and the first conduction portion 271 may be separated, or may be integrated. The first conduction portion 271 is a wall-like portion protruding from the scanning line 241 in the Z2 direction. The first conduction portion 271 couples the scanning line 241 and the gate electrode 232 to each other. Further, as illustrated in FIG. 6, the first conduction portion 271 passes through the insulating layers 221, 222, and 223, and contacts with the light shielding film 61. The first conduction portion 271 couples the scanning line 241 and the light shielding film 61 to each other.

Figure 8:
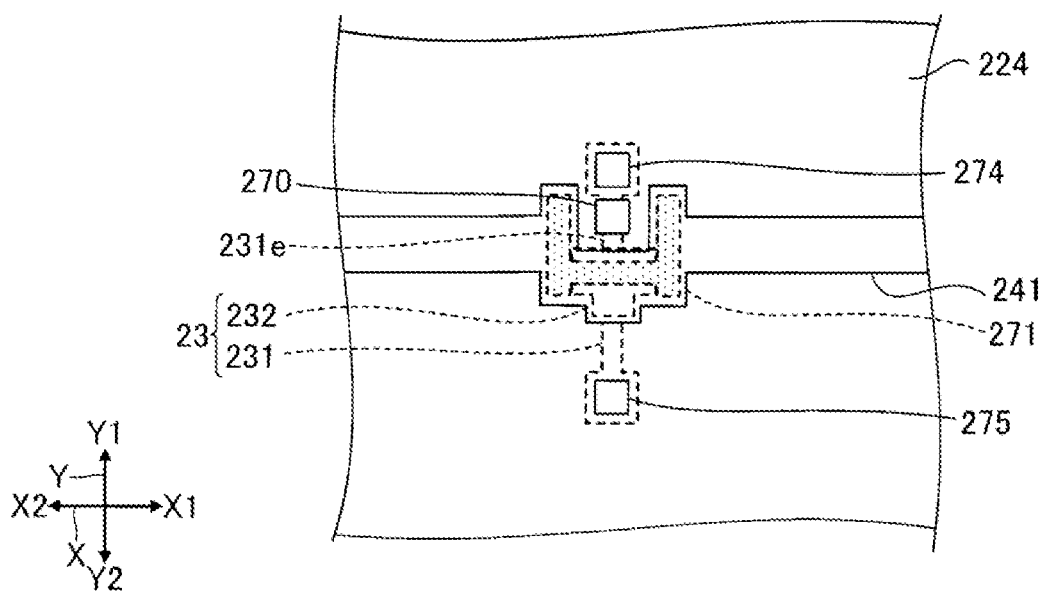
FIG. 8 is a plan view illustrating a scanning line and a first conduction portion included in the element substrate.

FIG. 8 is a plan view illustrating the scanning line 241 and the first conduction portion 271 included in the element substrate 200. In FIG. 8, in terms of convenience, a dotted pattern is provided to the first conduction portion 271. As illustrated in FIG. 8, the scanning line 241 extends along the X axis, and overlaps the gate electrode 232 in plan view. Further, the scanning line 241 does not overlap the second LDD region 231e of the semiconductor layer 231 in plan view, and is arranged in the periphery of the second LDD region 231e. Specifically, in plan view, the first conduction portion 271 includes a part positioned in the X1 direction with respect to the second LDD region 231e, a part positioned in the X2 direction with respect to the second LDD region 231e, and a part positioned in the Y2 direction with respect to the second LDD region 231e.

As described above, the first conduction portion 271 couples the scanning line 241 and the light shielding film 61 being "wiring lines" to each other. The first conduction portion 271 has a light shielding property, and functions as a light shielding portion of the semiconductor layer 231. Further, as illustrated in FIG. 6, the first conduction portion 271 is positioned on both sides of the semiconductor layer 231, as seen in a direction along the Y axis. The first conduction portion 271 is present. With this, as compared to a case where the first conduction portion 271 is not present, a light shielding property with respect to the semiconductor layer 231 can be improved. Thus, instability of a switching operation of the transistor 23, which is caused by light entering the semiconductor layer 231, is suppressed. Further, as described above, the first conduction portion 271 is coupled to the scanning line 241. Thus, the first conduction portion 271 functions as a back gate. Note that the scanning line 241 is electrically coupled to the scanning line driving circuit 110 included in the driving circuit 150.

Further, in the present exemplary embodiment, the gate electrode 232 and the first conduction portion 271 may not be electrically coupled to each other.

As illustrated in FIG. 5, the first constant potential line 243 is arranged between the insulating layer 224 and the insulating layer 225. The first constant potential line 243 is coupled to the shielding portion 270. The shielding portion 270 passes through the insulating layer 224, and is arranged in the middle of the insulating layer 223 in the thickness direction. Further, as illustrated in FIG. 8, the shielding portion 270 overlaps the second LDD region 231e in plan view. The shielding portion 270 functions as a shield that prevents a leakage electric field from the first conduction portion 271 from affecting the transistor 23. The shielding portion 270 described above is present. With this, a light shielding property of the semiconductor layer 231 can be improved while suppressing an impact of a leakage electric field. Thus, abnormal display is suppressed. Further, the shielding portion 270 also functions as a light shielding portion of the semiconductor layer 231.

Further, as illustrated in FIG. 8, the scanning line 241 described above does not overlap the second LDD region 231e and the drain region 231b of the semiconductor layer 231 in plan view. Thus, a leakage electric field of the scanning line 241 is prevented from affecting the second LDD region 231e.

As illustrated in FIG. 5 and FIG. 6, the capacitor 25 is arranged on the insulating layer 225. The capacitor 25 includes a first capacitor 251 and a second capacitor 252. The first capacitor 251 is arranged between the insulating layer 225 and the insulating layer 226. The first capacitor 251 includes a lower capacitance electrode 2511, an upper capacitance electrode 2512, and a dielectric layer 2513 arranged between the lower capacitance electrode 2511 and the upper capacitance electrode 2512. The lower capacitance electrode 2511 is coupled to the first constant potential line 243 via the second conduction portion 272 passing through the insulating layer 225. Further, the second capacitor 252 is arranged between the insulating layer 226 and the insulating layer 227. The second capacitor 252 includes a lower capacitance electrode 2521, an upper capacitance electrode 2522, and a dielectric layer 2523 arranged between the lower capacitance electrode 2521 and the upper capacitance electrode 2522. The lower capacitance electrode 2521 is coupled to the upper capacitance electrode 2512 of the first capacitor 251 via the third conduction portion 273 passing through the insulating layer 226. Further, the lower capacitance electrode 2521 is electrically coupled to the drain region 231b of the transistor 23a via the fourth conduction portion 274 passing through the insulating layers 222 to 226. Note that the lower capacitance electrode 2511, the upper capacitance electrode 2512, the lower capacitance electrode 2521, and the upper capacitance electrode 2522 are each constituted of, for example, a titanium nitride film.

As illustrated in FIG. 6, the signal line 242 and the relay electrode 245 are arranged between the insulating layer 227 and the insulating layer 228. As illustrated in FIG. 5, the signal line 242 is electrically coupled to the source region 231a of the transistor 23 via the fifth conduction portion 275 passing through the insulating layers 222 to 227. The relay electrode 245 illustrated in FIG. 6 is an electrode for electrically coupling the first constant potential line 243 and the pixel electrode 220a to each other. The relay electrode 245 is coupled to the upper capacitance electrode 2512 of the first capacitor 251 via the seventh conduction portion 277 passing through the insulating layers 226 and 227. Further, the relay electrode 245 is coupled to the pixel electrode 220a via the eighth conduction portion 278 passing through the insulating layers 228 and 229.

As illustrated in FIG. 5 and FIG. 6, the second constant potential line 244 is arranged between the insulating layer 228 and the insulating layer 229. The second constant potential line 244 extends along the X axis. A fixed potential such as a ground potential is applied to the second constant potential line 244, similarly to the first constant potential line 243. The fixed potential applied to the first constant potential line 243 and the fixed potential applied to the second constant potential line 244 are equal to each other. Note that the second constant potential line 244 and the first constant potential line 243 may be connected in, for example, the peripheral region A20 illustrated in FIG. 1.

Each of the materials of the wiring lines including the scanning line 241, the first constant potential line 243, the signal line 242, the second constant potential line 244, and the like described above is only required to be a material having conductivity. Examples of the material include polysilicon, metal, metal nitride, and metal silicide. Examples of the metal include tungsten (W), titanium (Ti), chromium (Cr), iron (Fe), and aluminum (Al). Specifically, each of the wiring lines is constituted of, for example, a layered body including an aluminum film and a titanium nitride film. When an aluminum film is included, resistance can be lowered as compared to a case where only a titanium nitride film is included. Note that each of the wiring lines may be constituted of a single material, or may include a plurality of materials.

Each of the materials of the first conduction portion 271 to the eighth conduction portion 278 and the shielding portion 270 is only required to be a material having conductivity. Examples of the material include metal, metal nitride, and metal silicide. Particularly, each of the materials preferably includes tungsten. Tungsten is excellent in a light shielding property and heat resistance. Thus, when tungsten is included, a light shielding property of each of the first conduction portion 271 to the eighth conduction portion 278 and the shielding portion 270 can be improved. Further, degradation in quality, which may be caused by thermal processing during manufacturing the element substrate 200, of each of the first conduction portion 271 to the eighth conduction portion 278 and the shielding portion 270 can be prevented. Further, each of the conduction portions may be constituted of a single material, or may include a plurality of materials. For example, each of the first conduction portion 271 to the eighth conduction portion 278 and the shielding portion 270 may have a layered structure including a layer mainly formed of tungsten and a layer formed of tungsten nitride.

Further, each of the second conduction portion 272 to the eighth conduction portion 278 and the shielding portion 270 is preferably a columnar plug. When a plug is provided, a space for arranging each of the conduction portions can be reduced as compared to a case where a trench is provided. Thus, reduction of an opening ratio, which may be caused by presence of each of the conduction portions, can be suppressed.

The element substrate 200 described above may include an optical member, which is not illustrated, such as a micro-array that converges or diverges light. When the optical member is included, efficiency of light utilization can be improved sufficiently. Accordingly, the electro-optical device 100 with brightness can be achieved.

1A-4 Light Shielding Films 61, 62 and 63

Figure 9:
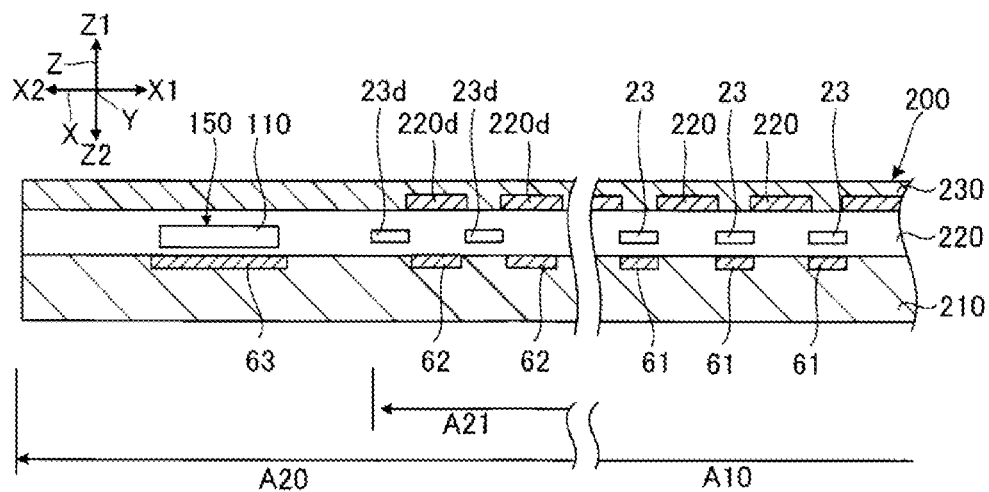
FIG. 9 is a view illustrating a light shielding film included in the element substrate.

FIG. 9 is a view illustrating light shielding films 61, 62, and 63 included in the element substrate 200. FIG. 9 corresponds to a cross-sectional surface taken along the line E-E in FIG. 1. As illustrated in FIG. 9, the element substrate 200 includes the plurality of light shielding films 61, the plurality of light shielding films 62, and the plurality of light shielding films 63. Each of the plurality of light shielding films 61, the plurality of light shielding films 62, and the plurality of light shielding films 63 has a light shielding property. As illustrated in FIG. 9, the plurality of light shielding films 61 are present in the display region A10. Each of the plurality of light shielding films 62 and the plurality of light shielding films 63 is present in the peripheral region A20. Further, the plurality of light shielding films 62 are present in the dummy pixel region A21 of the peripheral region A20.

Note that the light shielding film 61 functions as a back gate as described above. In contrast, each of the light shielding films 62 and 63 is not electrically coupled to each of the wiring lines. However, each of the light shielding films 62 and 63 may be electrically coupled to each of the freely-selected wiring lines.

Figure 10:
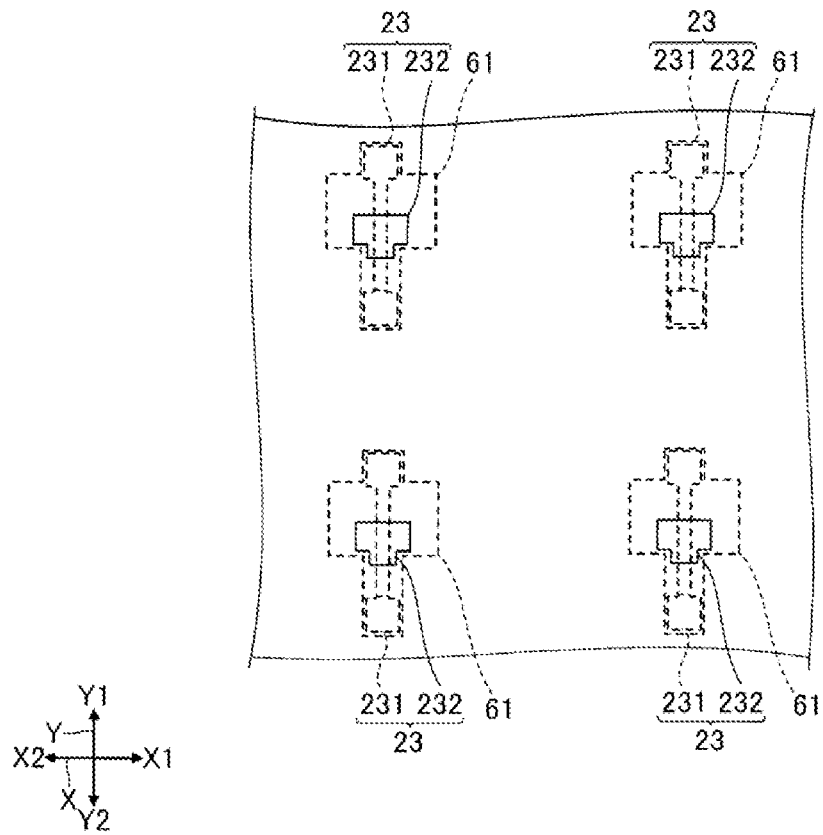
FIG. 10 is a plan view illustrating the light shielding films present in a display region.

FIG. 10 is a plan view illustrating the light shielding films 61 present in the display region A10. As illustrated in FIG. 10, the plurality of light shielding films 61 are arranged for the plurality of transistors 23 in a one-on-one manner. Each of the light shielding films 61 overlaps the corresponding transistor 23 in plan view. Particularly, each of the areas of the light shielding films 61 in plan view is larger than an area of the corresponding semiconductor layer 231 in plan view. Further, the transistors 23 are arranged in a matrix shape in plan view along the X axis and the Y axis, and thus the plurality of light shielding films 61 are arranged in a matrix shape in plan view along the X axis and the Y axis. Further, in the illustrated example, the light shielding film 61 has a longitudinal shape extending along the Y axis in plan view. The light shielding film 61 has a wide portion, which is wider than both the ends in the longitudinal direction, in the middle of the longitudinal direction. The portion overlaps the gate electrode 232 in plan view.

Each of the light shielding films 61 described above shields the transistor 23 from incident light. Particularly, as illustrated in FIG. 9, each of the light shielding films 61 is positioned in the Z2 direction with respect to the corresponding transistor 23. Thus, incident light from a side close to the element substrate 200 can be prevented from entering the semiconductor layer 231. Thus, instability of a switching operation of the transistor 23 is suppressed. Thus, degradation of display quality in the display region A10 is suppressed.

Figure 11:
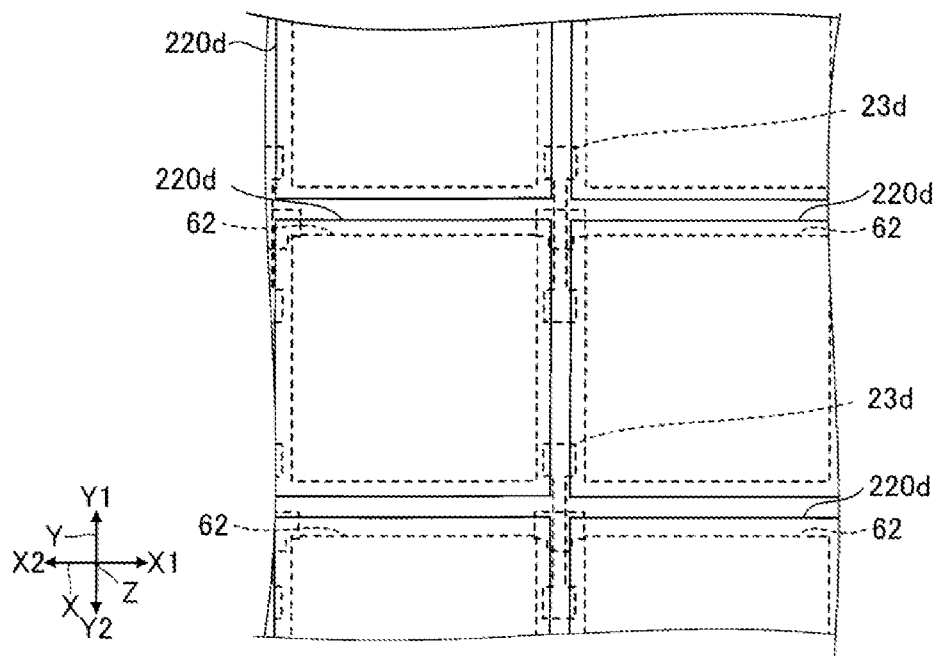
FIG. 11 is a plan view illustrating the light shielding films present in a dummy pixel region.

FIG. 11 is a plan view illustrating the light shielding film 62 in the dummy pixel region A21. As illustrated in FIG. 11, the plurality of light shielding films 62 are arranged for the plurality of dummy pixel electrodes 220d in a one-on-one manner. Each of the light shielding films 62 overlaps the corresponding dummy pixel electrode 220d in plan view. The dummy pixel electrodes 220d are arranged in two rows and two lines. Thus, although not illustrated, the plurality of light shielding films 62 are arranged in two rows and two lines. Further, although not illustrated, the plurality of light shielding films 62 are arranged in a frame shape surrounding the display region A10 in plan view.

Each of the light shielding films 62 shields the dummy pixel electrode 220d from incident light. Each of the light shielding films 62 suppresses reflection of light on the dummy pixel Pd. Particularly, as illustrated in FIG. 9, each of the light shielding films 62 is positioned in the Z2 direction with respect to the corresponding dummy pixel electrode 220d. Thus, degradation of display quality in the display region A10, which may be caused by return light of incident light from the side close to the element substrate 200 or the like, is suppressed.

Figure 12:
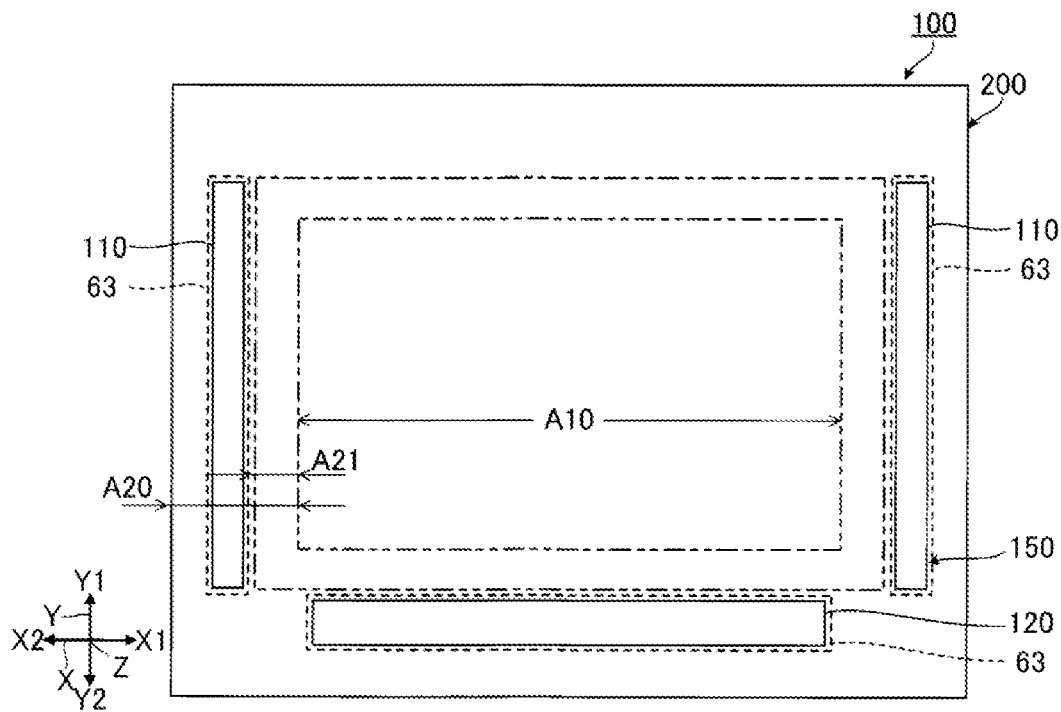
FIG. 12 is a plan view illustrating the light shielding films present in a periphery region.

FIG. 12 is a plan view illustrating the light shielding films 63 present in the peripheral region A20. As FIG. 12, the plurality of light shielding films 63 are arranged for the driving circuits 150. Specifically, one light shielding film 63 overlapping one of the two scanning line driving circuits 110 in plan view, one light shielding film 63 overlapping the other one of the two scanning line driving circuits 110 in plan view, and one light shielding film 63 overlapping the signal line driving circuit 120 in plan view are present.

The plurality of light shielding films 63 shields the driving circuits 150 from incident light. Particularly, as illustrated in FIG. 9, the light shielding film 63 is positioned in the Z2 direction with respect to the driving circuit 150. Thus, incident light from the element substrate 200 toward the counter substrate 300 can be prevented from entering the driving circuit 150. Thus, a malfunction risk, which may be caused by light entering the driving circuit 150, is suppressed. Further, unnecessary stray light can be prevented from entering the display region A10. Thus, high contrast can be secured, and hence degradation of display quality in the display region A10 is suppressed.

Figure 13:
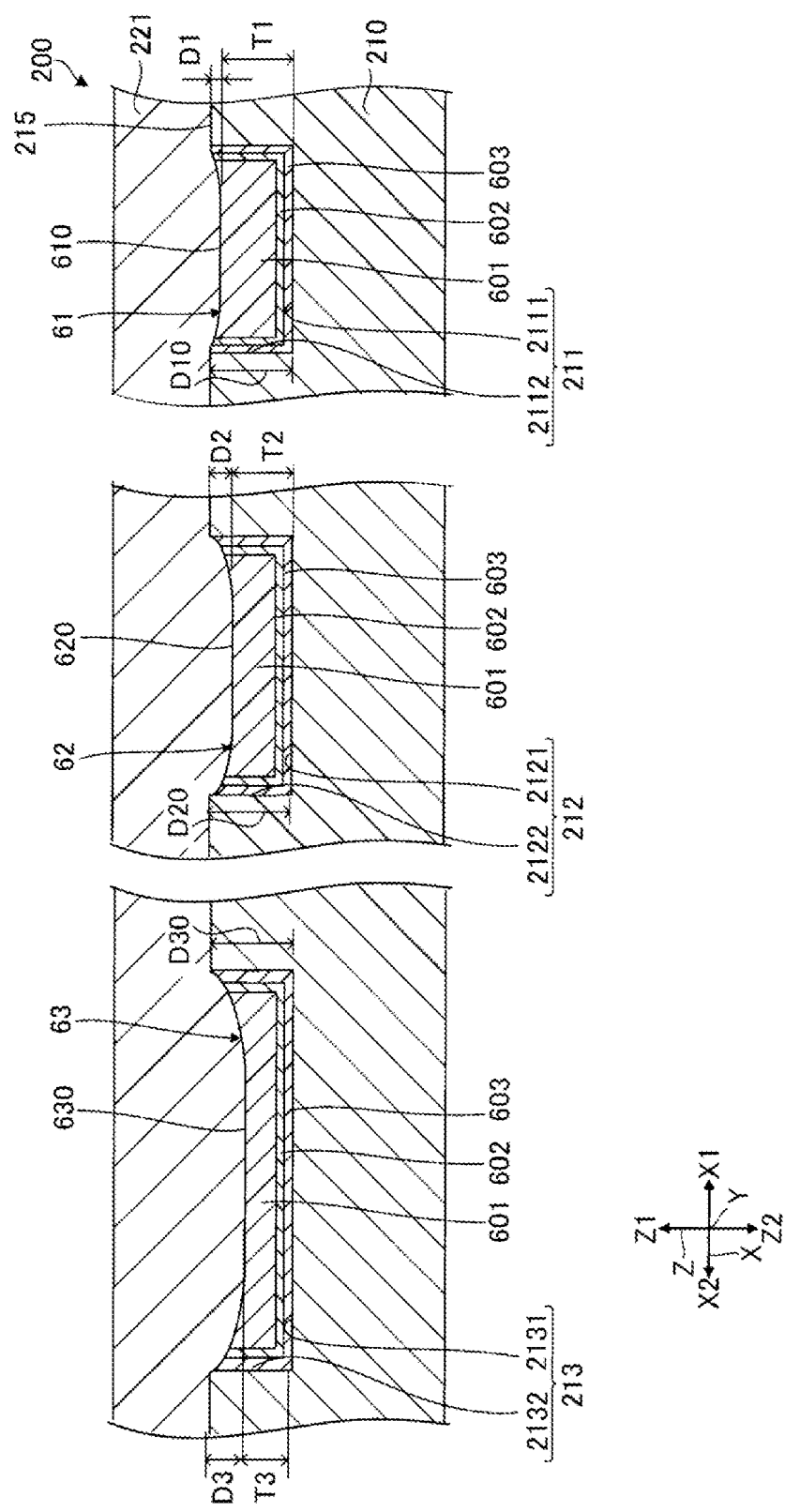
FIG. 13 is a cross-sectional view in which the light shielding films included in the element substrate are enlarged.

FIG. 13 is a cross-sectional view in which each of the light shielding films 61, 62, and 63 included in the element substrate 200 is enlarged. As illustrated in FIG. 13, each of the light shielding films 61, 62, and 63 is arranged in the first base member 210. Thus, the light shielding films 61, 62, and 63 are positioned in the same layer. In the present exemplary embodiment, as described above, the first base member 210 corresponds to the "first layer", and the insulating layer 221 corresponds to the "second layer".

As illustrated in FIG. 13, the first base member 210 includes the plurality of recessed portions 211, a plurality of recessed portions 212, and a plurality of recessed portions 213. Note that, in FIG. 13, one of the plurality of recessed portions 211, one of the plurality of recessed portions 212, and one of the plurality of recessed portions 213 are exemplarily illustrated. Each of the recessed portion 211, the recessed portion 212, and the recessed portion 213, is a depression formed in the first base member 210. The recessed portion 211 is present in the display region A10. The recessed portion 212 is present in the dummy pixel region A21 of the peripheral region A20. The recessed portion 213 is present in a region of the peripheral region A20 except for the dummy pixel region A21. The light shielding film 61 is arranged in the recessed portion 211. The light shielding film 62 is arranged in the recessed portion 212. The light shielding film 63 is arranged in the recessed portion 213. Note that the recessed portion 211 is formed for each of the light shielding films 61. The recessed portion 212 is formed for each of the light shielding films 62. The recessed portion 213 is formed for each of the light shielding films 63.

The recessed portion 211 includes a bottom surface 2111 and a side surface 2112. In the present exemplary embodiment, the bottom surface 2111 is a continuous flat surface along the X-Y plane without a step. The side surface 2112 connects the bottom surface 2111 and an upper surface 215 to each other. The upper surface 215 is a flat portion of the first base member 210, which contacts with the insulating layer 221. Further, in the present exemplary embodiment, the side surface 2112 is a surface along the Z axis parallel in the thickness direction of the first base member 210. Further, an angle formed between the bottom surface 2111 and the side surface 2112 is substantially 90 degrees. Note that the angle formed between the bottom surface 2111 and the side surface 2112 is not limited to 90 degrees. The side surface 2112 may be inclined with respect to the bottom surface 2111. Further, a connecting portion between the bottom surface 2111 and the side surface 2112 may be rounded. Similarly, a connecting portion between the side surface 2112 and the upper surface 215 may be rounded.

Similarly, the recessed portion 212 includes a bottom surface 2121 and a side surface 2122. In the present exemplary embodiment, the bottom surface 2121 is a continuous flat surface along the X-Y plane without a step. The side surface 2122 connects the bottom surface 2121 and the upper surface 215 to each other. Further, in the present exemplary embodiment, the side surface 2122 is a surface along the Z axis. Further, an angle formed between the bottom surface 2121 and the side surface 2122 is substantially 90 degrees. Note that the angle formed between the bottom surface 2121 and the side surface 2122 is not limited to 90 degrees. The side surface 2122 may be inclined with respect to the bottom surface 2121. Further, a connecting portion between the bottom surface 2121 and the side surface 2122 may be rounded. Similarly, a connecting portion between the side surface 2122 and the upper surface 215 may be rounded.

Further, the recessed portion 213 includes a bottom surface 2131 and a side surface 2132. In the present exemplary embodiment, the bottom surface 2131 is a continuous flat surface along the X-Y plane without a step. The side surface 2132 connects the bottom surface 2131 and the upper surface 215 to each other. Further, in the present exemplary embodiment, the side surface 2132 is a surface along the Z axis. Further, an angle formed between the bottom surface 2131 and the side surface 2132 is substantially 90 degrees. Note that the angle formed between the bottom surface 2131 and the side surface 2132 is not limited to 90 degrees. The side surface 2132 may be inclined with respect to the bottom surface 2131. Further, a connecting portion between the bottom surface 2131 and the side surface 2132 may be rounded. Similarly, a connecting portion between the side surface 2132 and the upper surface 215 may be rounded.

A depth D10 of the recessed portion 211, a depth D20 of the recessed portion 212, and a depth D30 of the recessed portion 213 are equal to one another. Further, the recessed portions 211, 212, and 213 are collectively formed by etching through use of a hard mask constituted of, for example, silicon or the like. Further, each of the light shielding films 61, 62, and 63 is formed by a so-called damascene method.

Each of the light shielding films 61, 62, and 63 includes the first metal film 601, a second metal film 602, and a third metal film 603. The third metal film 603 is arranged on the first base member 210. The second metal film 602 is arranged on the third metal film 603. The first metal film 601 is arranged on the second metal film 602. That is, the third metal film 603, the second metal film 602, and the first metal film 601 are layered from the first base member 210 in the stated order. Regarding the first metal film 601, the second metal film 602 in the following description, and the third metal film 603, the light shielding film 61 will be exemplarily described.

The third metal film 603 is constituted of, for example, tungsten silicide. The second metal film 602 is constituted of, for example, tungsten nitride (WN) or titanium nitride (TiN). The first metal film 601 is constituted of tungsten. Among various types of metal, tungsten is excellent in heat resistance, and has an Optical Density (OD) value that is less likely to be lowered by, for example, thermal processing during manufacturing. Thus, when the first metal film 601 includes tungsten, a light shielding property of the light shielding film 61 can be improved.

When the second metal film 602 and the third metal film 603 are present, adhesion between the first base member 210 and the light shielding film 61 can be improved as compared to a case without the second metal film 602 and the third metal film 603. Particularly, the third metal film 603 includes silicon atoms, and hence is excellent in adhesion with the first base member 210 constituted of a silicon-based inorganic compound.

Further, as compared to tungsten, tungsten silicide has and OD value that is likely to be lowered by thermal processing. Thus, when the third metal film 603 and the first metal film 601 are directly in contact with each other, there may be a risk in that the OD value of the first metal film 601 is lowered due to tungsten silicide included in the third metal film 603. In contrast, the second metal film 602 is present between the third metal film 603 and the first metal film 601, and hence lowering of the OD value of the first metal film 601, which may be caused by tungsten silicide, is suppressed. That is, the second metal film 602 functions as a barrier layer that prevents tungsten silicide included in the third metal film 603 from dispersing in the first metal film 601.

Note that the second metal film 602 may adopt any one of a configuration including both tungsten nitride and titanium nitride and a structure in which a metal nitride film including tungsten nitride and a metal nitride film including titanium nitride are layered. Further, each of the first metal film 601, the second metal film 602, and the third metal film 603 may be constituted of a material other than the metal described above. Each of the first metal film 601, the second metal film 602, and the third metal film 603 is only required to have at least a light shielding property, and may be constituted by including metal other than the metal described above or a resin material, for example. Further, one or both of the second metal film 602 and the third metal film 603 may be omitted.

The light shielding film 61 includes a concave surface 610 in contact with the insulating layer 221. The light shielding film 62 includes a concave surface 620 in contact with the insulating layer 221. The light shielding film 63 includes a concave surface 630 in contact with the insulating layer 221. The concave surface 610 is a depression formed in the light shielding film 61, and is a curved surface that is recessed in the Z2 direction. The center of the concave surface 610 is recessed more than the outer edge. Similarly, the concave surface 620 is a depression formed in the light shielding film 62, and is a curved surface that is recessed in the Z2 direction. The center of the concave surface 620 is recessed more than the outer edge. Further, the concave surface 630 is a depression formed in the light shielding film 63, and is a curved surface that is recessed in the Z2 direction. The center of the concave surface 630 is recessed more than the outer edge.

A depth D2 of the concave surface 620 is greater than a depth D1 of the concave surface 610, and is smaller than a depth D3 of the concave surface 630. Thus, the relationship among the depths D1, D2, and D3 satisfies D1<D2<D3. Note that each of the depths D1, D2, and D3 indicates a maximum depth.

Further, in another view, the depth D1 of the light shielding film 61, which is present closer to the center than the outer edge of the element substrate 200 is in plan view, is smaller than the depth D3 of the light shielding film 63, which is present closer to the outer edge than the center of the element substrate 200 is.

As described above, the relationship among the depths D1, D2, and D3 satisfies D1<D2<D3, and the depth D10, D20, and D30 are equal to one another. Thus, a thickness T2 of the light shielding film 62 is smaller than a thickness T1 of the light shielding film 61, and is greater than a thickness T3 of the light shielding film 63. Thus, the relationship of the thicknesses T1, T2, and T3 satisfies T3<T2<T1. Note that each of the thicknesses T1, T2, and T3 indicates a minimum thickness. Further, the thickness of the first metal film 601 described above differs among the light shielding films 61, 62, and 63.

Further, in each of the light shielding films 61, 62, and 63, the thickness of the third metal film 603 described above is greater than the thickness of the second metal film 602, and is smaller than the thickness of the first metal film 601. Note that each of the thicknesses of the first metal film 601, the second metal film 602, and the third metal film 603 indicates an average thickness. When the thickness of the first metal film 601 is the thickest, a light shielding property of each of the light shielding films 61, 62, and 63 can be improved. Further, the third metal film 603 is particularly excellent in adhesion with respect to the first base member 210. Thus, when the thickness of the third metal film 603 is greater than the second metal film 602, adhesion of each of the light shielding films 61, 62, and 63 with respect to the first base member 210 can be improved, as compare to a case where the thickness of the third metal film 603 is smaller.

Note that a size relationship of the thicknesses in each of the first metal film 601, the second metal film 602, and the third metal film 603 is not limited to the relationship described above. Further, the size relationship of the thickness may differ among the light shielding films 61, 62, and 63.

The thickness of the first metal film 601 is not limited particularly, but preferably falls within a range from 10 nm to 500 nm, for example. The thickness of the second metal film 602 is not limited particularly, but preferably falls within a range from 0.1 nm to 50 nm, for example. The thickness of the third metal film 603 is not limited particularly, but preferably falls within a range from 1 nm to 100 nm, for example. When each of the thicknesses satisfies the range described above, adhesion of the light shielding film 61 is improved while suppressing the entire thickness T1 of the light shielding film 61. At the same time, an effect of improving a light shielding property of the light shielding film 61 can be exerted particularly. Note that the similar effect can be exerted with regard to the light shielding films 62 and 63.

Further, as described above, the light shielding film 61 overlaps the transistor 23 in plan view, the light shielding film 62 overlaps the dummy pixel electrode 220d in plan view, and the light shielding film 63 overlaps the scanning line driving circuit 110 in plan view, for example. The area of the light shielding film 62 in plan view is larger than the area of the light shielding film 61 in plan view, and is smaller than the area of the light shielding film 63 in plan view.

As described above, each of the light shielding films 61, 62, and 63 is arranged between the first base member 210 being the "first layer" and the insulating layer 221 being the "second layer". Further, each of the light shielding films 61, 62, and 62 includes tungsten. As described above, when tungsten is included, a light shielding property of each of the light shielding films 61, 62, and 62 can be improved.

Further, as described above, the light shielding film 61 includes the concave surface 610, the light shielding film 62 includes the concave surface 620, and the light shielding film 63 includes the concave surface 630. Thus, the thickness T1 is not constant, the thickness T2 is not constant, and the thickness T3 is not constant. Here, as each of the thicknesses of the thicknesses T1, T2, and T3 is increased more, a light shielding property is higher. Further, tungsten is excellent in a light shielding property. However, when each of the light shielding films 61, 62, and 63 is excessively increased, there is a risk in that a defect due to a film stress may be caused. The defect includes increase of warpage of the first base member 210, generation of a crack in each of the light shielding films 61, 62, and 63, and the like. Thus, when the concave surfaces 610, 620, and 630 are provided, each of the thicknesses T1, T2, and T3 is prevented from being increased excessively while securing each of the areas of the light shielding films 61, 62, and 63 in plan view. Thus, while suppressing the defect, light can be prevented from entering the transistors 23 and the like. Therefore, degradation of display quality in the display region A10 is suppressed.

Further, it is conceived that, for example, warpage of the first base member 210 is suppressed by evenly reducing the thickness T1 of the light shielding film 61 to a degree of not lowering a light shielding property significantly in such a way to reduce a stress applied to the first base member 210. In contrast, in the present exemplary embodiment, the light shielding film 61 is provided with the concave surface 610, and thus the thickness T1 of the light shielding film 61 is reduced. With this, as compared to a case where the thickness T1 of the light shielding film 61 is evenly reduced, a contact area between the light shielding film 61 and the first base member 210 can be increased. Thus, during manufacturing or the like, the light shielding film 61 can be prevented from peeling off from the first base member 210. For example, in a case where the thickness T1 is reduced evenly, the depth D10 of the recessed portion 211 is smaller, and hence the contact area between the light shielding film 61 and the first base member 210 is disadvantageously reduced. In contrast, in the present exemplary embodiment, the depth D10 of the recessed portion 211 is secured, and thus the contact area between the light shielding film 61 and the first base member 210 is increased. The light shielding film 61 is provided with the concave surface 610, and thus the thickness T1 is reduced. With this, both warpage of the first base member 210 and peeling of the light shielding film 61 can be suppressed effectively. Note that the same holds true for the light shielding films 62 and 63.

In the present exemplary embodiment, the light shielding film 61 corresponds to a "first light shielding film", and each of the light shielding films 62 and 63 corresponds to a "second light shielding film". The light shielding film 61 is present in the display region A10, each of the light shielding films 62 and 63 is present in the peripheral region A20. Further, the concave surface 610 corresponds to a "first concave surface", and each of the concave surface 620 and the concave surface 630 corresponds to a "second concave surface". Moreover, as described above, the depth D1 of the concave surface 610 and the depth D2 of the concave surface 620 are different from each other. Similarly, the depth D1 of the concave surface 610 and the depth D3 of the concave surface 630 are different from each other. In the present exemplary embodiment, the depth D1 of the concave surface 610 is smaller than the depth D2 of the concave surface 620. Similarly, the depth D1 of the concave surface 610 is smaller than the depth D3 of the concave surface 630.

The display region A10 is a region for displaying an image. Thus, the display region A10 has a light transmitting amount larger than that in the peripheral region A20. Further, a malfunction of the transistor 23 present in the display region A10 is relevant to degradation of display quality. Thus, the light shielding film 61 present in the display region A10 preferably has a light shielding property superior than that of the light shielding films 62 and 63. Further, all the light shielding films 61, 62, and 63 present in the element substrate 200 are increased in thickness, a stress generated in the first base member 210 is disadvantageously increased. In view of this, in the present exemplary embodiment, the depth D1 of the concave surface 610 is smaller than each of the depth D2 of the concave surface 620 and the depth D3 of the concave surface 630, and thus each of the thicknesses T2 and T3 is smaller than the thickness T1. As a result, a stress generated in the first base member 210 can be prevented from being increased. Thus, a light shielding property in the display region A10 can be improved particularly, and increase of warpage of the first base member 210 can be suppressed. In this manner, a thickness is adjusted in accordance with a position at which a light shielding property is intended to be improved. With this, while improving a light shielding property of the position, increase of warpage of the first base member 210 can be suppressed.

Further, as described above, the area of the light shielding film 61 in plan view and the area of the light shielding film 62 in plan view are different from each other. Similarly, the area of the light shielding film 61 in plan view and the area of the light shielding film 63 in plan view are different from each other. In the present exemplary embodiment, the area of the light shielding film 61 in plan view is smaller than the area of the light shielding film 62 in plan view. Similarly, the area of the light shielding film 61 in plan view is smaller than the area of the light shielding film 63 in plan view. Further, the thickness T1 of the light shielding film 61 is greater than the thickness T2 of the light shielding film 62. Similarly, the thickness T1 of the light shielding film 61 is greater than the thickness T3 of the light shielding film 63. That is, the film having a larger area in plan view has a smaller thickness. Thus, a stress generated in the first base member 210 can be prevented from being increased with the film having a larger area in plan view as compared to a case with the film having a larger thickness. Thus, increase of warpage of the first base member 210 can be prevented.

Further, in the present exemplary embodiment, the light shielding film 62 corresponds to a "third light shielding film", and the light shielding film 63 corresponds to a "fourth light shielding film". Further, the concave surface 620 corresponds to a "third concave surface", and the concave surface 630 corresponds to a "fourth concave surface". Moreover, the depth D2 of the concave surface 620 and the depth D3 of the concave surface 630 are different from each other. In the present exemplary embodiment, the depth D2 of the concave surface 620 is smaller than the depth D3 of the concave surface 630. As described above, the light shielding films 62 are arranged for the dummy pixel electrodes 220d. Meanwhile, the light shielding film 63 are arranged for the driving circuits 150. Each of the scanning line driving circuits 110, which are included in the driving circuits 150, and the signal line driving circuit 120 includes a plurality of semiconductor elements, which are not illustrated. When the light shielding films 63 are arranged across the plurality of semiconductor elements, the area in plan view is more likely to be increased. As a result, a stress generated in the first base member 210 is more likely to be increased. Therefore, the depth D3 of the concave surface 630 is greater than the depth D2 of the concave surface 620, and thus the thickness T3 of the light shielding film 63 is smaller than the thickness of the light shielding film 62. With this, the thickness T3 can be prevented from being excessively increased. Thus, increase of warpage of the first base member 210 can be suppressed more effectively.

Further, in the present exemplary embodiment, the recessed portion 211 provided in the first base member 210 corresponds to a "first recessed portion", and the recessed portion 212 provided in the first base member 210 corresponds to a "second recessed portion". Further, the recessed portion 212 corresponds to a "third recessed portion", and the recessed portion 213 provided in the first base member 210 corresponds to a "fourth recessed portion". As described above, the light shielding film 61 is arranged in the recessed portion 211, the light shielding film 62 is arranged in the recessed portion 212, and the light shielding film 63 is arranged in the recessed portion 213.

When the light shielding film 61 is arranged in the recessed portion 211, the light shielding film 61 can be formed to have a large thickness, and adhesion between the light shielding film 61 and the first base member 210 can be improved, as compared to a case where the light shielding film 61 is arranged on the upper surface 215 of the first base member 210. That is, when the light shielding film 61 is formed by the damascene method, the thickness T1 can be easily increased, and adhesion between the light shielding film 61 and the first base member 210 can be improved. Thus, peeling of the light shielding film 61 or the like can be suppressed, and a light shielding property can be improved. Note that the same holds true for the recessed portion 212 and the recessed portion 213. Further, in order to form the element substrate 200 having a small size and high quality, the light shielding film 61 is desired to be miniaturized and be excellent in shape accuracy. The light shielding film 61 is formed in the recessed portion 211 by the damascene method, and thus the light shielding film 61 can be miniaturized. Note that the same holds true for the recessed portion 212 and the recessed portion 213.

Further, as illustrated in FIG. 13, the bottom surface 2111 of the recessed portion 211 is a continuous flat surface without a step. Irregular reflection of light at a step can be suppressed because the bottom surface 2111 is not provided with a step. Thus, a risk of light entering the transistor 23 can be lowered.

Further, for example, the light shielding films 61, 62, and 63 are formed in the same process as described below. First, a metal film including tungsten is formed on the first base member 210 by a chemical vapor deposition (CVD) method or the like. After that, chemical mechanical polishing (CMP) or the like is performed. With this, the light shielding films 61, 62, and 63 are formed. When manufacturing conditions of the light shielding films 61, 62, and 63 are adjusted, the depths D1, D2, and D3 can be adjusted through use of, for example, dishing. Further, for example, when an area in plan view differs among the areas of the recessed portion 211, the recessed portion 212, and the recessed portion 213, the depths D1, D2, and D3 can be adjusted. That is, when an area in plan view differs among the light shielding films 61, 62, and 63, the depths D1, D2, and D3 can be adjusted. Therefore, when the areas of the light shielding films 61, 62, and 63 in plan view are adjusted, the thicknesses T1, T2, and T3 can be adjusted.

Further, the plurality of light shielding films 61 are not connected to one another, and the light shielding film 61 is arranged for each of the transistors 23. Thus, increase of warpage of the first base member 210, which may be caused by a film stress of the light shielding film 61, can be prevented. Note that the plurality of light shielding films 61 may be connected to each other.

Further, in the present exemplary embodiment, the light shielding films 61, 62, and 63 are present in the element substrate 200. The plurality of transistors 23 and the plurality of semiconductor elements, which are not illustrated, are present in the element substrate 200. Thus, in order to secure a light shielding property with respect to the plurality of transistors 23 and the like, the light shielding films 61, 62, and 63 are present in the element substrate 200 more preferably than in the counter substrate 300. A light shielding property with respect to the plurality of transistors 23 and the like is secured, and thus display quality can be improved more.

Further, each of the thicknesses T1, T2, and T3 or the like is adjusted in accordance with for example, each of ratios of the display region A10 and the peripheral region A20 in the element substrate 200, a degree of warpage of the first base member 210, and a position at which a light shielding property is intended to be secured.

1B. Second Exemplary Embodiment

A second exemplary embodiment will be described. Note that, in each example given below, a reference symbol used in the description of the first exemplary embodiment is used again for the same element as that in the first exemplary embodiment, and each detailed description thereof will be appropriately omitted.

Figure 14:
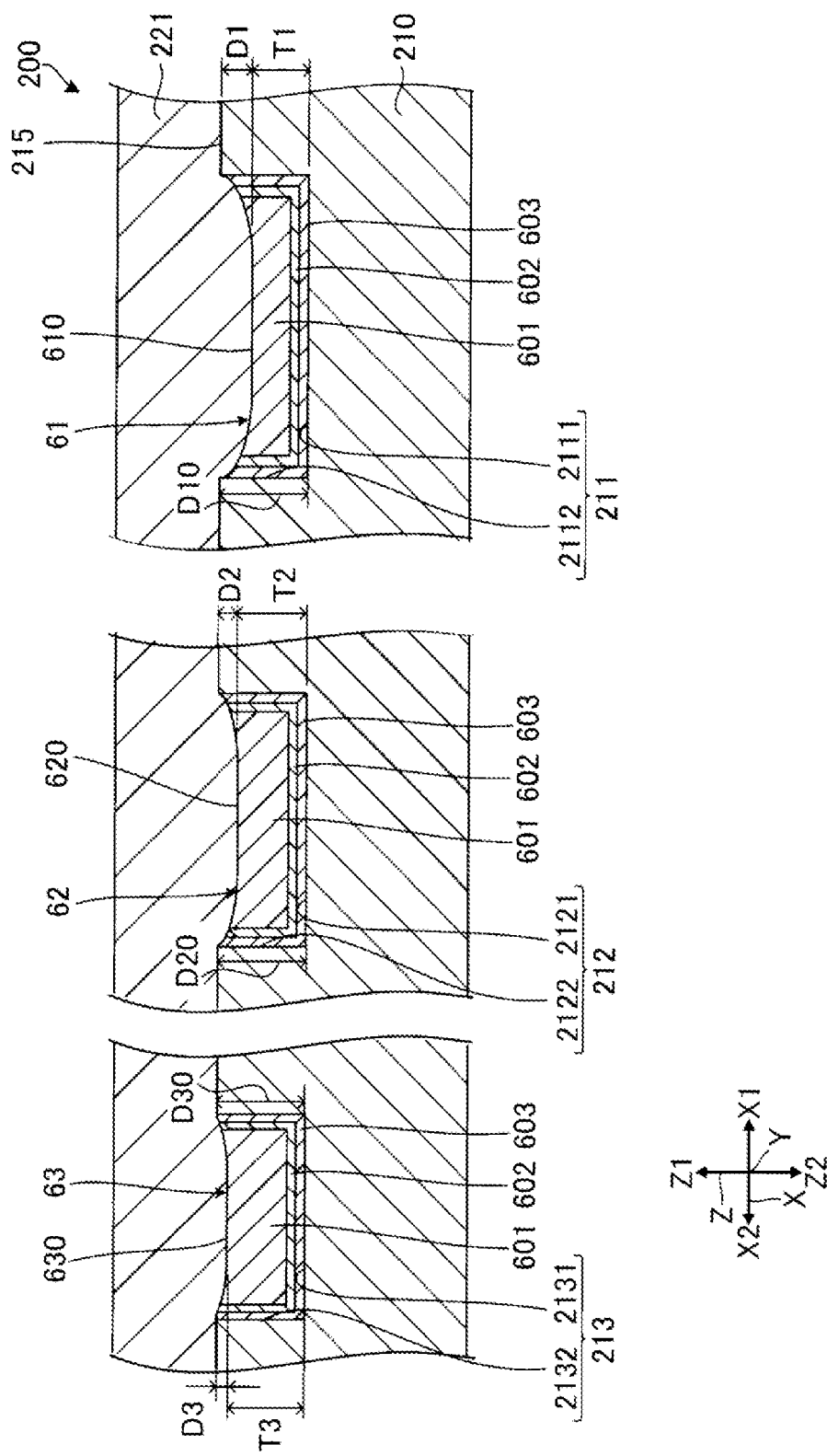
FIG. 14 is a cross-sectional view in which light shielding films according to a second exemplary embodiment are enlarged.

FIG. 14 is a cross-sectional view in which the light shielding films 61, 62, and 63 according to the second exemplary embodiment are enlarged. In the present exemplary embodiment, the size relationship of the areas of the light shielding films 61, 62, and 63 in plan view is different from the size relationship in the first exemplary embodiment. The light shielding films 61, 62, and 63 illustrated in FIG. 14 are the same as those in the first exemplary embodiment, except for the size relationship.

As illustrated in FIG. 14, the depth D1 of the light shielding film 61 of the concave surface 610 is greater than the depth D2 of the concave surface 620 of the light shielding film 62. Similarly, the depth D1 of the light shielding film 61 of the concave surface 610 is greater than the depth D3 of the light shielding film 63 of the concave surface 630. When the depth D1 is greater than each of the depths D2 and D3, each of the thicknesses T2 and T3 is easily formed to be greater than the thickness T1. As a result, as compared to the first exemplary embodiment, a light shielding property in the peripheral region A20 can be improved. For example, even when each of the thicknesses T2 and T3 is greater than the thickness T1, increase of warpage of the first base member 210 is suppressed, depending on a ratio of the area of the peripheral region A20 to the element substrate 200. Further, for example, the area of the light shielding film 61 in plan view is sufficiently large, the transistor 23 can sufficiently shielded from incident light even when the thickness T1 of the light shielding film 61 is greater than the thickness T2 or T3.

Further, in the present exemplary embodiment, the area of the light shielding film 61 in plan view is larger than the area of the light shielding film 62 in plan view. Similarly, the area of the light shielding film 61 in plan view is larger than the area of the light shielding film 63 in plan view. Further, the thickness T1 of the light shielding film 61 is smaller than the thickness T2 of the light shielding film 62. Similarly, the thickness T1 of the light shielding film 61 is smaller than the thickness T3 of the light shielding film 63. That is, the film having a larger area in plan view has a smaller thickness. Thus, a stress generated in the first base member 210 can be prevented from being increased with the film having a larger area in plan view as compared to a case with the film having a larger thickness. Thus, increase of warpage of the first base member 210 can be prevented.

Note that, although not illustrated, for example, each of the light shielding films 62 in the present exemplary embodiment does not overlap the dummy pixel electrode 220$d$ in plan view, and overlaps the transistor 23$d$ electrically coupled to the dummy pixel electrode 220$d$. In this case, the area of the light shielding film 62 in plan view may be smaller than the area of the light shielding film 61 in plan view.

Further, although not illustrated, for example, the plurality of light shielding films 63 in the present exemplary embodiment are individually arranged for the plurality of semiconductor elements included in the driving circuit 150. Thus, depending on a size of the semiconductor elements or the like, the area of the light shielding film 63 in plan view may be smaller than the area of the light shielding film 61 in plan view.

Further, in the present exemplary embodiment, the depth D2 of the concave surface 620 is greater than the depth D3 of the concave surface 630. Thus, the thickness T2 of the light shielding film 62 is smaller than the thickness T3 of the light shielding film 63. For example, the area of the dummy pixel region A21 in plan view is larger than the area of the driving circuit 150 in plan view. In this case, when the thickness T2 is smaller than the thickness T3, increase of warpage of the first base member 210 can be prevented as compared to a case where the thickness T2 is greater than the thickness T3.

Similarly to the first exemplary embodiment, a light shielding property can also be improved with the light shielding films 61, 62, and 63 according to the second exemplary embodiment described above.

1C. Third Exemplary Embodiment

A third exemplary embodiment will be described. Note that, in each example given below, a reference symbol used in the description of the first exemplary embodiment is used again for the same element as that in the first exemplary embodiment, and each detailed description thereof will be appropriately omitted.

Figure 15:
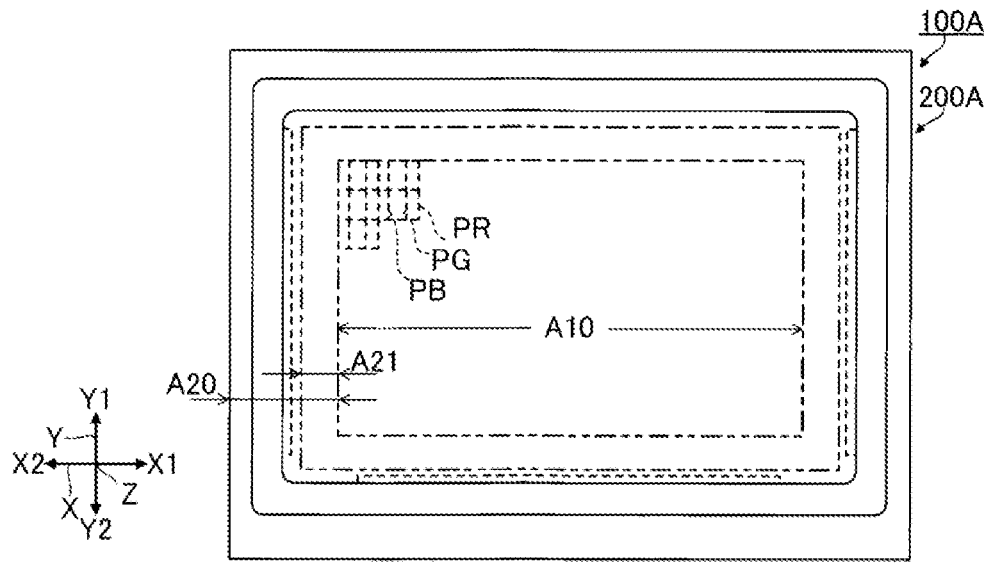
FIG. 15 is a view illustrating pixels included in an electro-optical device according to a third exemplary embodiment.
Figure 24:
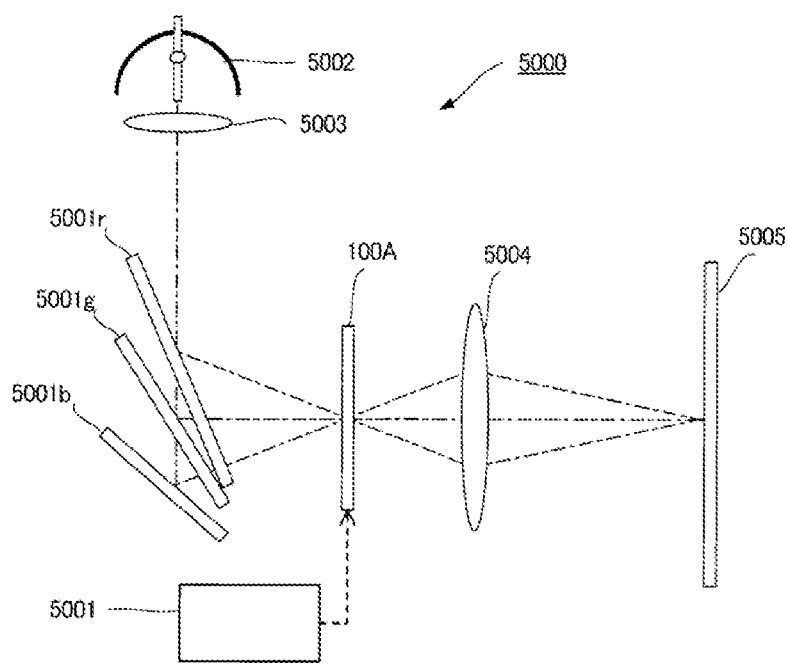
FIG. 24 is a schematic diagram illustrating a projector as an example of an electronic apparatus.

FIG. 15 is a view illustrating first pixels PB, second pixels PG, and third pixels PR included in an electro-optical device 100A according to the third exemplary embodiment. The electro-optical device 100A according to the present exemplary embodiment is the same as the electro-optical device 100 according to the first exemplary embodiment, but is different in that the first pixels PB, the second pixels PG, and the third pixels PR are included. Further, the electro-optical device 100A is applied to, for example, a single plate type projector, which is illustrated in FIG. 24 described later. In this case, for example, the first pixel PB corresponds to a blue wavelength region, the second pixel PG corresponds to a green wavelength region, and the third pixel PR corresponds to a red wavelength region.

As illustrated in FIG. 15, the display region A10 included in the electro-optical device 100A includes the plurality of first pixels PB, the plurality of second pixels PG, and the plurality of third pixels PR. The plurality of first pixels PB, the plurality of second pixels PG, and the plurality of third pixels PR are aligned along the Y axis in a stripe manner. Note that the array of the first pixels PB, the second pixels PG, and the third pixels PR is not limited to the illustrated example, and a staggered shape may be adopted, for example.

In the example illustrated in FIG. 15, each of the areas of the third pixels PR in plan view is larger than each of the areas of the first pixels PB in plan view, and is smaller than each of the areas of the second pixels PG in plan view. Note that the size relationship of the areas of the first pixel PB, the second pixel PG, and the third pixel PR in plan view is not limited to the illustrated example, but is freely selected. For example, each of the areas of the first pixels PB in plan view may be larger than each of the areas of the third pixels PR in plan view, and may be larger than each of the areas of the second pixels PG in plan view.

Each of the first pixel PB, the second pixel PG, and the third pixel PR has the same configuration as that of the pixel P in the first exemplary embodiment, but is different in arrangement and an area in plan view. In the following description, an element relevant to the first pixel PB is denoted with a suffix "b", an element relevant to the second pixel PG is denoted with a suffix "g", and an element relevant to the third pixel PR is denoted with a suffix "r". Further, in a case where there is no need to make distinction among the first pixel PB, the second pixel PG, and the third pixel PR, the pixels are collectively referred to as the pixels P. Further, in a case where there is no need to make distinction among the first pixel PB, the second pixel PG, and the third pixel PR, an element corresponding to each of the first pixel PB, the second pixel PG, and the third pixel PR is not denoted with a suffix.

Figure 16:
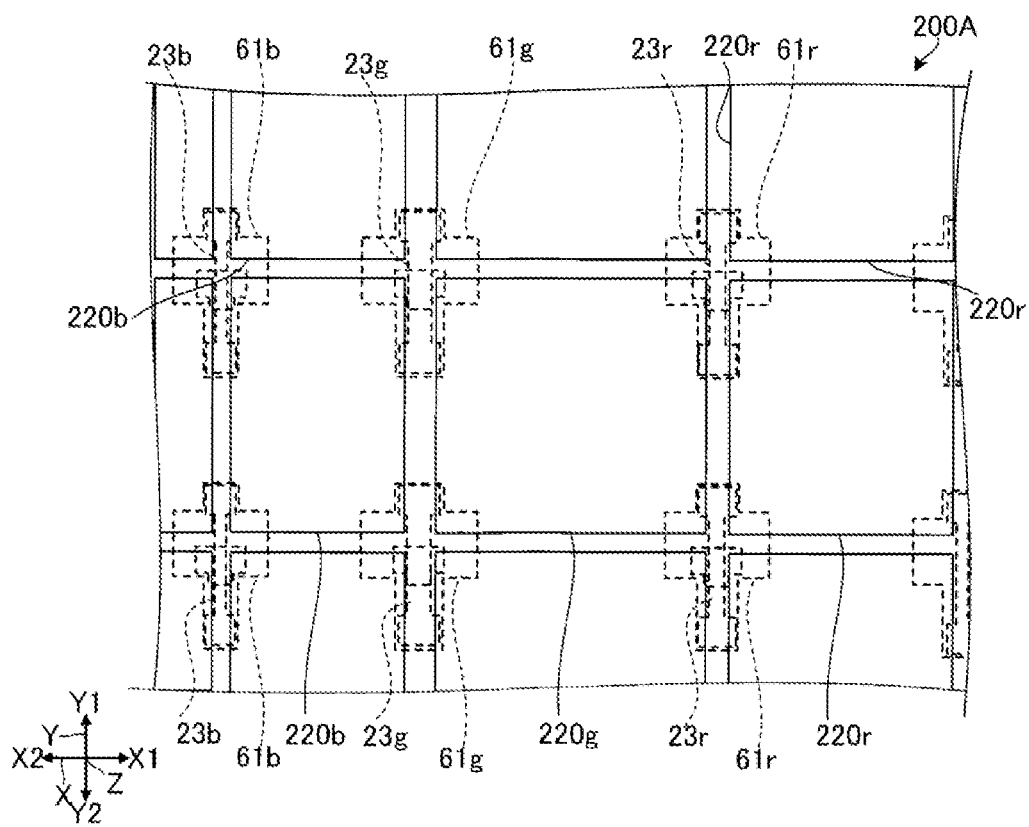
FIG. 16 is a plan view illustrating a display region of an element substrate according to the third embodiment.

FIG. 16 is a plan view illustrating the display region A10 of an element substrate 200A according to the third embodiment. As illustrated in FIG. 16, in the element substrate 200A, areas of a pixel electrode 200r, a pixel electrode 200g, and a pixel electrode 200b in plan view are different from one another. Specifically, as illustrated in FIG. 16, the area of the pixel electrode 200r in plan view is larger than the area of the pixel electrode 200b in plan view, and is smaller than the area of the pixel electrode 200g in plan view.

Similarly, in the element substrate 200A, areas of a transistor 23r, a transistor 23g, and a transistor 23b in plan view are different from one another. Specifically, as illustrated in FIG. 16, the length of the semiconductor layer 231, which is included in the transistor 23r, along the X axis is larger than the length of the semiconductor layer 231, which is included in the transistor 23b, along the X axis, and is smaller than the semiconductor layer 231, which is included in the transistor 23g, along the X axis. Thus, the area of the transistor 23r in plan view is larger than the area of the transistor 23b in plan view, and is smaller than the area of the transistor 23g in plan view.

Further, in the element substrate 200A, areas of light shielding films 61b, 61g, and 61r in plan view are different from one another. Specifically, the area of the light shielding film 61r in plan view is larger than the area of the light shielding film 61b in plan view, and is smaller than the area of the light shielding film 61g in plan view. Here, any one of the light shielding films 61b, 61g, and 61r corresponds to a "fifth light shielding film", and another one of the light shielding films 61b, 61g, and 61r corresponds to a "sixth light shielding film". For example, the light shielding film 61b corresponds to the "fifth light shielding film", and the light shielding film 61g corresponds to the "sixth light shielding film". In this case, a concave surface 610b of the light shielding film 61b corresponds to a "fifth concave surface", and a concave surface 610g of the light shielding film 61g corresponds to a "sixth concave surface".

Figure 17:
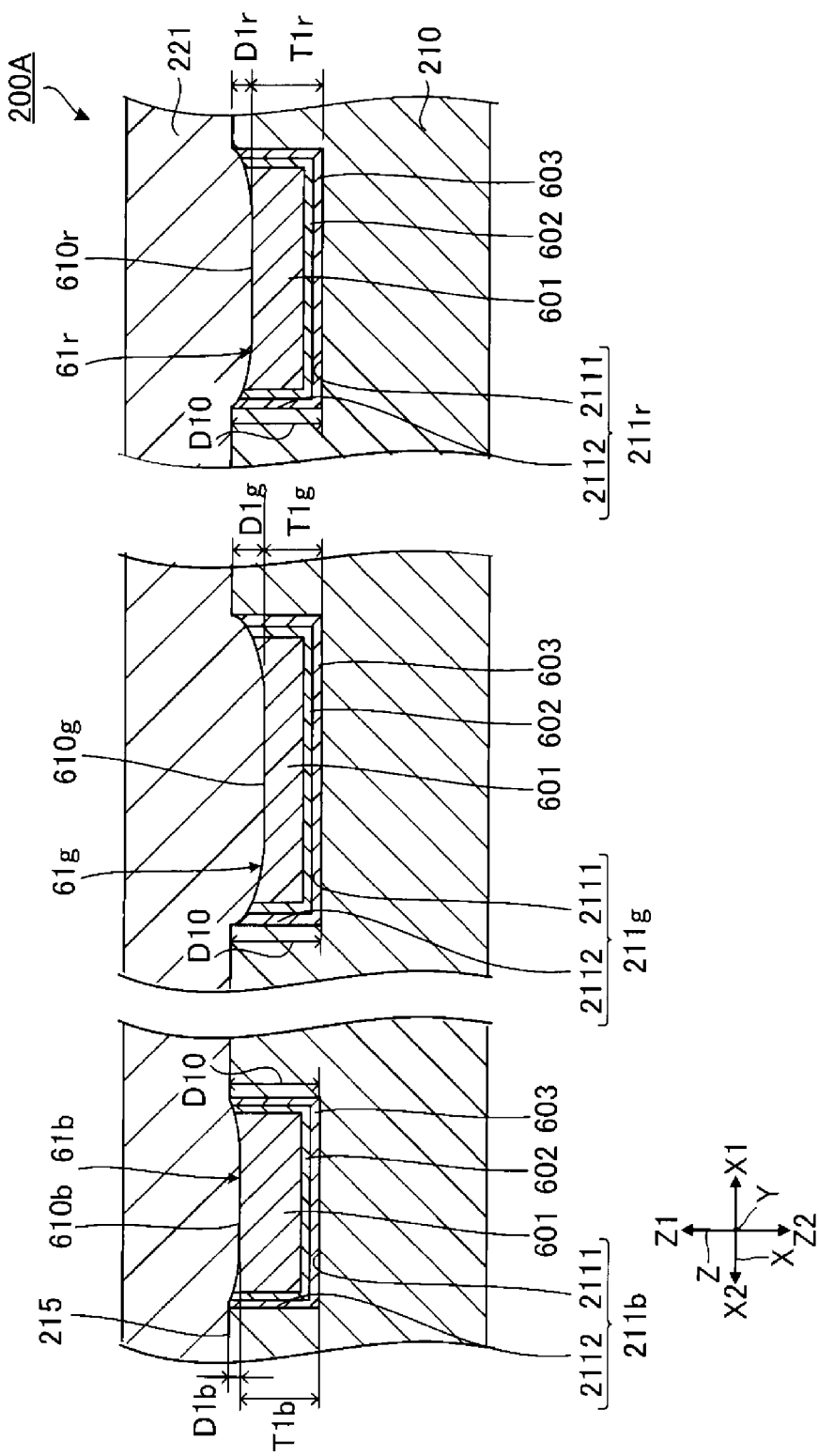
FIG. 17 is a cross-sectional view in which light shielding films according to the third exemplary embodiment are enlarged.

FIG. 17 is a cross-sectional view in which the light shielding films 61b, 61g, and 61r according to the third exemplary embodiment are enlarged. As illustrated in FIG. 17, in the element substrate 200A, a depth D1b of the concave surface 610b of the light shielding film 61b, a depth D1g of the concave surface 610g of the light shielding film 61g, and a depth D1r of the concave surface 610r of the light shielding film 61r are different from one another. Thus, in the element substrate 200A, a thickness T1b of the light shielding film 61b, a thickness T1g of the light shielding film 61g, and a thickness T1r of the light shielding film 61r are different from one another. Specifically, as illustrated in FIG. 17, the depth D1r of the concave surface 610r is greater than the depth D1b of the concave surface 610b, and is smaller than the depth D1g of the concave surface 610g. The thickness T1r of the light shielding film 61r is smaller than the thickness T1b of the light shielding film 61b, and is greater than the thickness T1g of the light shielding film 61g.

In this manner, in the present exemplary embodiment, the area of the light shielding film 61 in plan view corresponds to the area of the semiconductor layer 231 of the transistor 23 in plan view. The area of the light shielding film 61 in plan view is adjusted in accordance with the area of the semiconductor layer 231 in plan view. With this, light entering the semiconductor layer 231 can be effectively suppressed, and hence instability of a switching operation of the transistor 23 is suppressed. Further, the thickness of the light shielding film 61 is adjusted in accordance with the area of the light shielding film 61 in plan view. With this, warpage of the first base member 210 can be suppressed.

Further, in the present exemplary embodiment, one of the recessed portions 211b, 211g, and 211r included in the first base member 210 corresponds to a "fifth recessed portion", and another one of the recessed portions 211b, 211g, and 211r corresponds to a "sixth recessed portion". For example, in a case where the light shielding film 61b corresponds to a "fifth light shielding film" and the light shielding film 61g corresponds to a "sixth light shielding film", the recessed portion 211b corresponds to the "fifth recessed portion", and the recessed portion 211g corresponds to the "sixth recessed portion".

In the present exemplary embodiment that is similar to the first exemplary embodiment, when the light shielding film 61 is arranged in the recessed portion 211, the light shielding film 61 can be formed to have a large thickness, and adhesion between the light shielding film 61 and the first base member 210 can be improved, as compared to a case where the light shielding film 61 is arranged on the upper surface 215 of the first base member 210. Thus, a light shielding property of the light shielding film 61 can be improved, and peeling of the light shielding film 61 can be suppressed.

Similarly to the first exemplary embodiment, a light shielding property can also be improved with the light shielding films 61b, 61g, and 61r according to the third exemplary embodiment described above.

1D. Fourth Exemplary Embodiment

A fourth exemplary embodiment will be described. Note that, in each example given below, a reference symbol used in the description of the first exemplary embodiment is used again for the same element as that in the first exemplary embodiment, and each detailed description thereof will be appropriately omitted.

Figure 18:
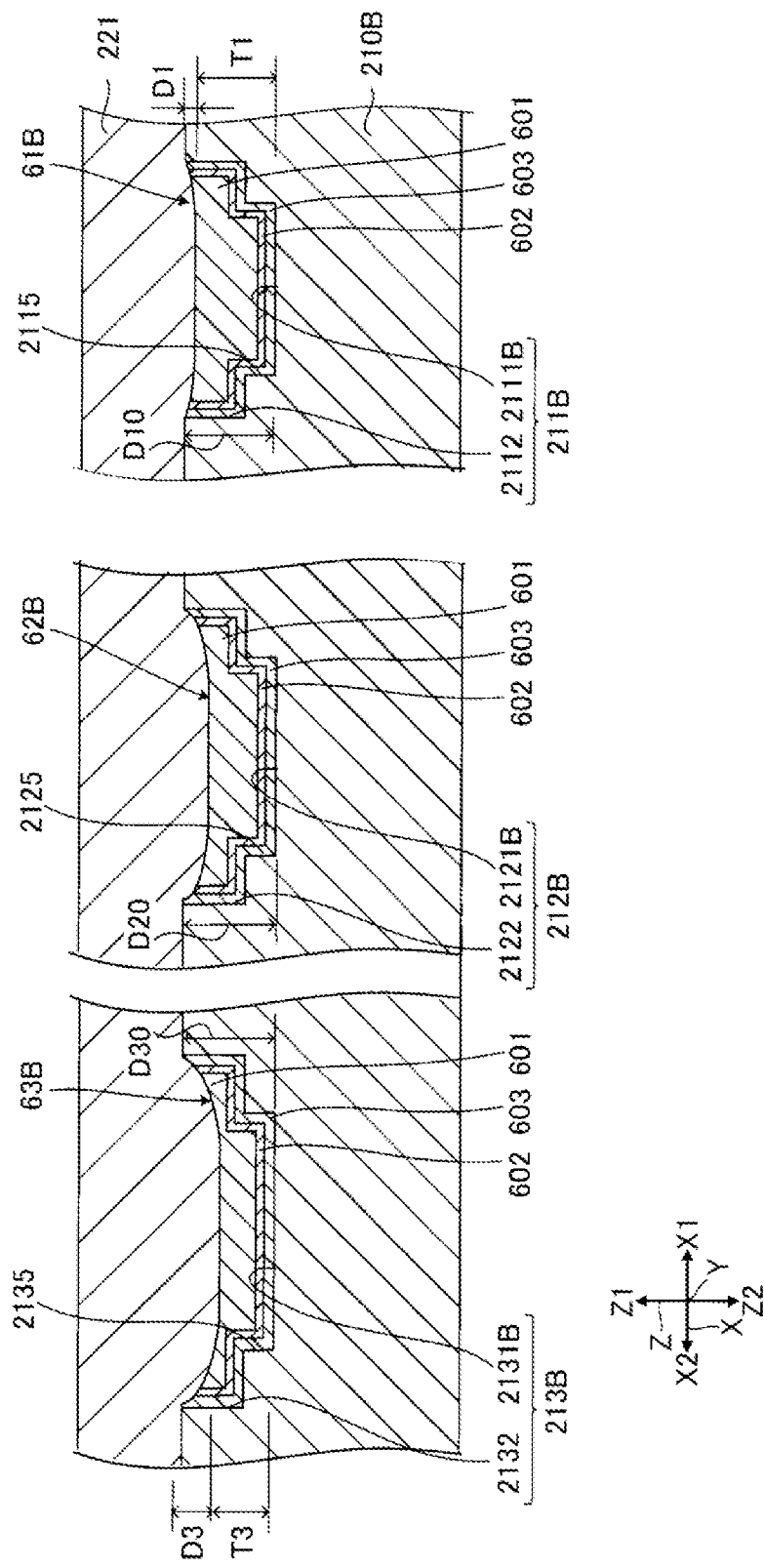
FIG. 18 is a cross-sectional view in which light shielding films according to a fourth exemplary embodiment are enlarged.
Figure 19:
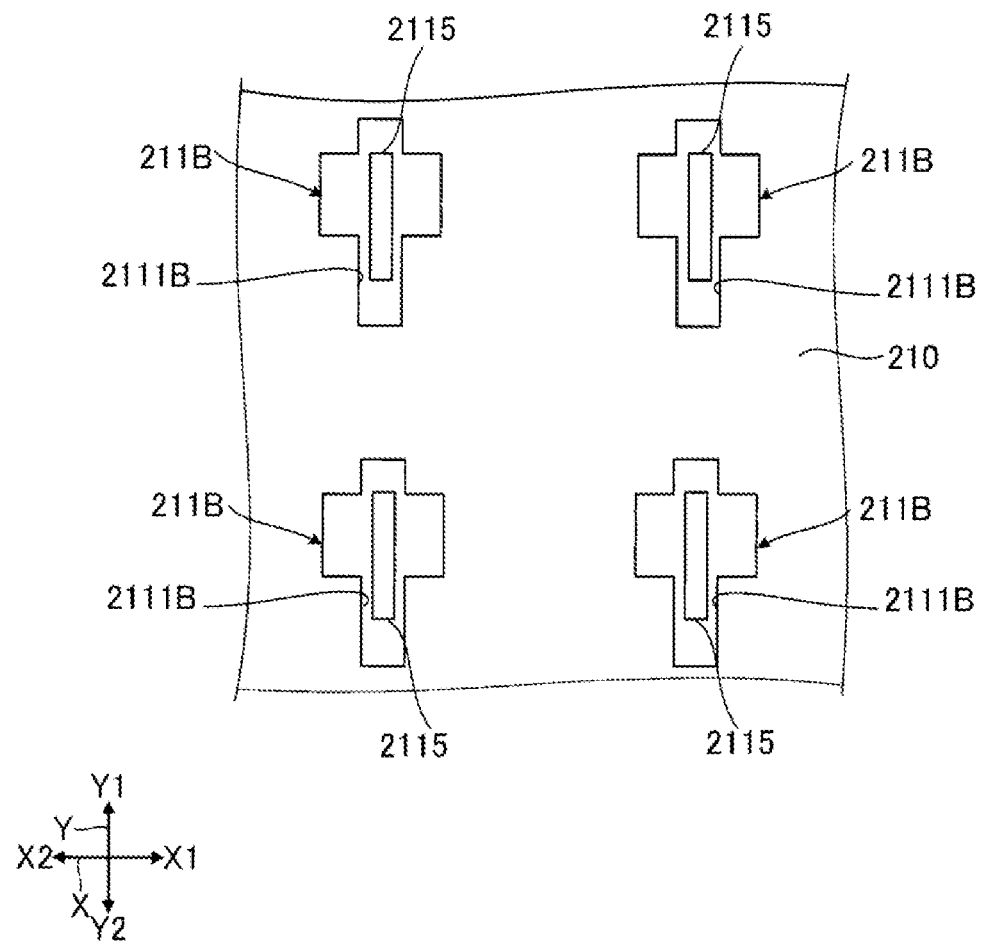
FIG. 19 is a plan view illustrating the light shielding films present in a display region according to the fourth exemplary embodiment.

FIG. 18 is a cross-sectional view in which light shielding films 61B, 62B, and 63B according to the fourth exemplary embodiment are enlarged. FIG. 19 is a plan view illustrating the light shielding films 61B present in the display region A10 according to the fourth exemplary embodiment. Each of the shapes of the light shielding films 61B, 62B, and 63B in the present exemplary embodiment is different from each of the shapes of the light shielding films 61, 62, and 63 in the first exemplary embodiment. The light shielding films 61B, 62B, and 63B have the same configuration as that of the light shielding films 61, 62, and 63 except for the shape. Further, shapes of recessed portions 211B, 212B, and 213B in the present exemplary embodiment are different from the shapes of the recessed portions 211, 212, and 213 in the first exemplary embodiment. The recessed portions 211B, 212B, and 213B have the same configuration as that of the recessed portions 211, 212, and 213 except for the shapes.

As illustrated in FIG. 18, a bottom surface 2111B of the recessed portion 211B included in a first base member 210B includes a step 2115. Similarly, a bottom surface 2121B of the recessed portion 212B includes a step 2125. Further, a bottom surface 2131B of the recessed portion 213B includes a step 2135. Thus, each of the bottom surfaces of the "first recessed portion" and the "second recessed portion" includes a step. Further, each of the bottom surfaces of the "third recessed portion" and the "fourth recessed portion" includes a step.

As illustrated in FIG. 18 and FIG. 19, with the step 2115, the center of the bottom surface 2111B of the recessed portion 211B in plan view is recessed more than the outer edge. Similarly, although not illustrated, with the step 2125, the center of the bottom surface 2121B of the recessed portion 212B in plan view is recessed more than the outer edge. Further, although not illustrated, with the step 2135, the center of the bottom surface 2131B of the recessed portion 213B in plan view is recessed more than the outer edge. Note that the recessed portion 213B may include steps 2135 for the semiconductor elements included in the driving circuit 150. That is, the plurality of steps 2135 may be present in one recessed portion 213B.

As illustrated in FIG. 18, the shape of the contact surface of the light shielding film 61B with respect to the first base member 210B corresponds to the shape of the recessed portion 211B. Thus, the contact surface of the light shielding film 61B with respect to the first base member 210B includes a step surface. Similarly, the shape of the contact surface of the light shielding film 62B with respect to the first base member 210B corresponds to the shape of the recessed portion 212B. Thus, the contact surface of the light shielding film 62B with respect to the first base member 210B includes a step surface. Further, the contact surface of the light shielding film 63B with respect to the first base member 210B corresponds to the shape of the recessed portion 213B. Thus, the contact surface of the light shielding film 63B with respect to the first base member 210B includes a step surface.

Each of the light shielding films 61B, 62B, and 63B is formed through use of a so-called dual damascene method. When the dual damascene method is used, crack resistance of each of the light shielding film 61B, 62B, and 63B, can be improved more as compared to a case where the damascene method is used. Further, with the step 2115, the thickness of the center portion of the light shielding film 61B is greater than the thickness of the outer peripheral portion. The center portion overlaps the channel region 231c, the first LDD region 231d, and the second LDD region 231e, which are illustrated in FIG. 7, in plan view. Thus, instability of a switching operation of the transistor 23 is suppressed more effectively with the light shielding film 61B.

Although not illustrated, the dual damascene method described in the present exemplary embodiment is applicable to the third exemplary embodiment. That is, each of the bottom surface 2111 of the recessed portion 211b, the bottom surface 2111 of the recessed portion 211g, and the bottom surface 2111 of the recessed portion 211r, which are illustrated in FIG. 17, may include the step 2115. Therefore, for example, in a case where the recessed portion 211b and the recessed portion 211g, which are illustrated in FIG. 17, correspond to a "fifth recessed portion" and a "sixth recessed portion", respectively, each of the bottom surface 2111 of the recessed portion 211b and the bottom surface 2111 of the recessed portion 211g may include the step 2115. When the step 2115 is included, crack resistance of the light shielding film 61 can be improved as described above as compared to a case where the step 2115 is not included.

Similarly to the first exemplary embodiment, a light shielding property can also be improved with the light shielding films 61B, 62B, and 63B according to the fourth exemplary embodiment described above. Note that, in the description give above, all the light shielding films 61B, 62B, and 63B formed by the dual damascene method. However, any of those may be formed by, for example, the damascene method.

1E. Fifth Exemplary Embodiment

A fifth exemplary embodiment will be described. Note that, in each example given below, a reference symbol used in the description of the first exemplary embodiment is used again for the same element as that in the first exemplary embodiment, and each detailed description thereof will be appropriately omitted.

Figure 20:
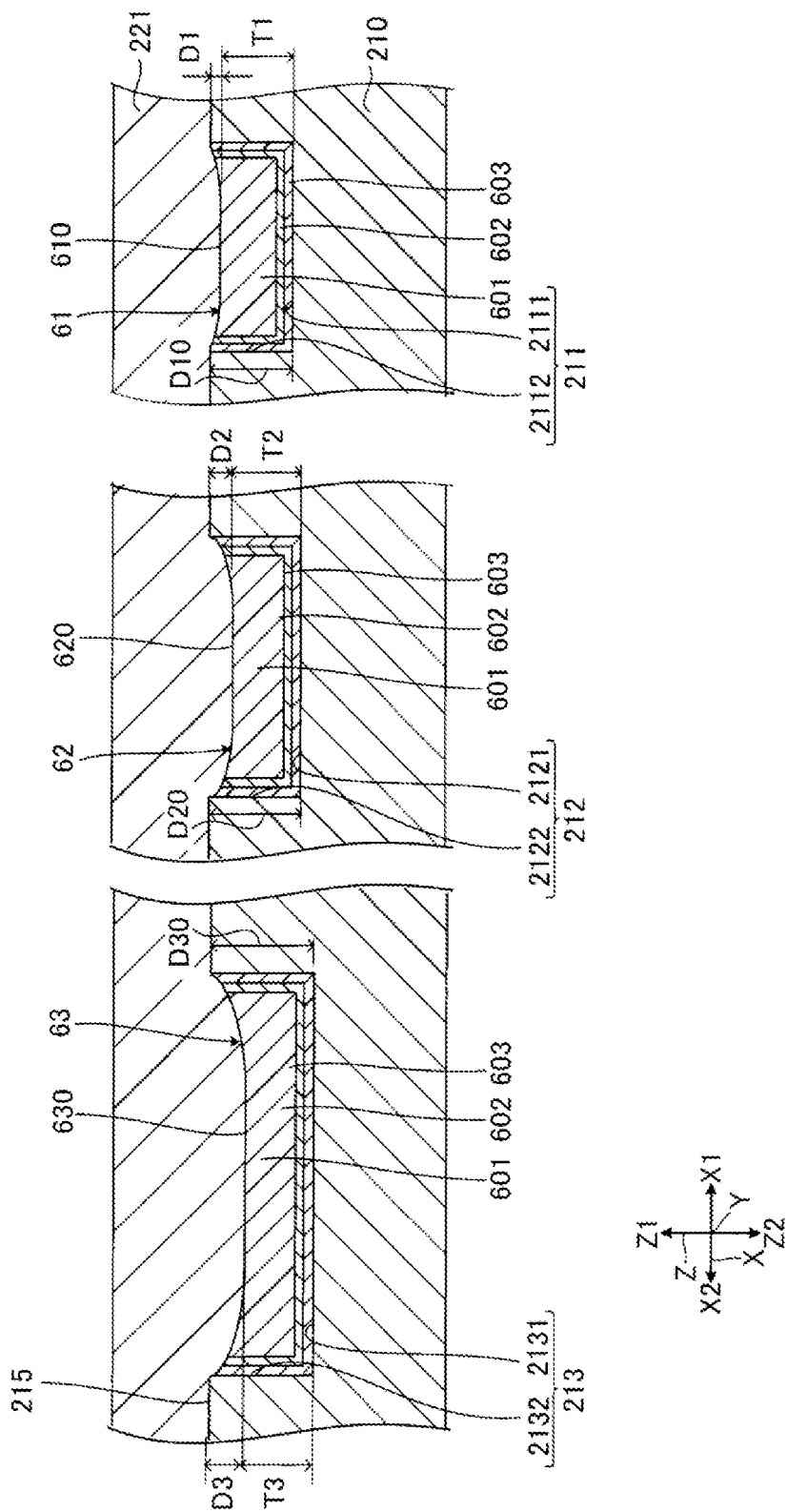
FIG. 20 is a cross-sectional view in which light shielding films according to a fifth exemplary embodiment are enlarged.

FIG. 20 is a cross-sectional view in which the light shielding films 61, 62, and 63 according to the fifth exemplary embodiment are enlarged. In the present exemplary embodiment, the thickness T1 of the light shielding film 61, the thickness T2 of the light shielding film 62, and the thickness T3 of the light shielding film 63 are equal to one another. The light shielding films 61, 62, and 63 illustrated in FIG. 20 are the same as those in the first exemplary embodiment, except for the thickness T1, the thickness T2, and the thickness T3 that are equal to one another. Further, in the present exemplary embodiment, the depth D10 of the recessed portion 211, the depth D20 of the recessed portion 212, and the depth D30 of the recessed portion 213 are different from one another. The recessed portions 211, 212, and 213 illustrated in FIG. 20 are the same as those in the first exemplary embodiment, except for the depths D10, D20, and D30 that are different from one another.

As illustrated in FIG. 20, the depth D20 of the recessed portion 212 is greater than the depth D10 of the recessed portion 211, and is smaller than the depth D30 of the recessed portion 213. Thus, the relationship of the depths D10, D20, and D30 satisfies D10<D20<D30. Further, in the present exemplary embodiment that is similar to the first exemplary embodiment, the depth D2 of the concave surface 620 is greater than the depth D1 of the concave surface 620, and is smaller than the depth D3 of the concave surface 630. Further, in the present exemplary embodiment, that is similar to the first exemplary embodiment, the area of the light shielding film 62 in plan view is larger than the area of the light shielding film 61 in plan view, and is smaller than the area of the light shielding film 63 in plan view. Moreover, in the present exemplary embodiment, the thicknesses T1, T2, and T3 are equal to one another.

As in the present exemplary embodiment, in accordance with the order in which the areas of the recessed portions 211, 212, and 213 in plan view are larger, the depth D1 of the concave surface 610, the depth D2 of the concave surface 620, and the depth D3 of the concave surface 630 are greater in the stated order. The depths D10, D20, and D30 are adjusted in advance in accordance with the depths D1, D2, and D3, respectively. With this, the thicknesses T1, T2, and T3 can be equal to one another. Thus, variation in light shielding property of the light shielding films 61, 62, and 63 can be suppressed.

Similarly to the first exemplary embodiment, a light shielding property can also be improved with the light shielding films 61, 62, and 63 according to the fifth exemplary embodiment described above.

1F. Modification Example

Each of the exemplary embodiments exemplified in the above can be variously modified. Specific modification aspects applied to each of the embodiments described above are exemplified below. Further, each of modification modes, which will be described below, of the first exemplary embodiment is suitably applied to the second exemplary embodiment to the fifth exemplary embodiment to an extent that the modification modes do not contradict the exemplary embodiments.

In the first exemplary embodiment described above, the area of the light shielding film 61 in plan view, the area of the light shielding film 62 in plan view, and the area of the light shielding film 63 in plan view are larger in the stated order. However, the size relationship of the areas in plan view is not limited to this order. Similarly, the depths D1, D2, and D3 are greater in the stated order. However, the size relationship of the depths D1, D2, and D3 is not limited to this order. Further, the thicknesses T3, T2, and T1 are larger in the stated order, but the size relationship of the thicknesses T1, T2, and T3 is not limited to this order.

In the first exemplary embodiment described above, the areas of the light shielding films in plan view are different from one another, but may be equal to one another. Similarly, the depths D1, D2, and D3 are different from one another, but may be equal to one another. The thicknesses T1, T2, and T3 are different from one another, but may be equal to one another. The depths D10, D20, and D30 are equal to one another, but may be different from one another.

In the first exemplary embodiment described above, the first base member 210 corresponds to the "first layer", and the insulating layer 221 corresponds to the "second layer". However, the "first layer" may be other than the first base member 210, and the "second layer" may be other than the insulating layer 221. For example, the "first layer" may be the insulating layer 221, and the "second layer" may be the insulating layer 222. Further, the light shielding film 61 may be positioned in an upper layer of the transistor 23.

In the first exemplary embodiment described above, the element substrate 200 includes the "light shielding films", but the counter substrate 300 may include the "light shielding films". In this case, for example, although not illustrated, in a case where the counter substrate 300 includes a black matrix that defines the plurality of pixels P in a planar manner, the black matrix may correspond to the "light shielding film". Further, the partition 350 included in the counter substrate 300 may correspond to the "light shielding film".

In the first exemplary embodiment described above, the light shielding films 61, 62, and 63 are present, but any of the light shielding films 61, 62, and 63 may be omitted. For example, the light shielding films 62 and 63 may be omitted. Further, each of the recessed portions 211, 212, and 213 may be omitted. Thus, for example, each of the light shielding films 61, 62, and 63 may be present in the upper surface 215 of the first base member 210.

In the first exemplary embodiment described above, each of the concave surfaces 610, 620, and 630 has a curved shape, but may have a shape including a step. In the first exemplary embodiment described above, each of the bottom surface 2111 of the recessed portion 211, the bottom surface 2121 of the recessed portion 212, and the bottom surface 2131 of the recessed portion 213 is a flat surface, but may be a curved surface. In the first exemplary embodiment described above, each of the side surface 2112 of the recessed portion 211, the side surface 2122 of the recessed portion 212, and the side surface 2132 of the recessed portion 213 is a flat surface, but may be a curved surface.

In the first exemplary embodiment described above, a case where a TFT is used as the transistor 23 is given as an example. However, the transistor 23 is not limited to a TFT, and may be, for example, a metal-oxide-semiconductor field-effect transistor (MOSFET) or the like.

In the first exemplary embodiment described above, the electro-optical device 100 of an active matrix drive type is given as an example, but is not limited to this type. A drive type of the electro-optical device may be, for example, a passive matrix drive type or the like.

2. Electronic Apparatus

The electro-optical device 100 can be used for various electronic apparatuses.

Figure 21:
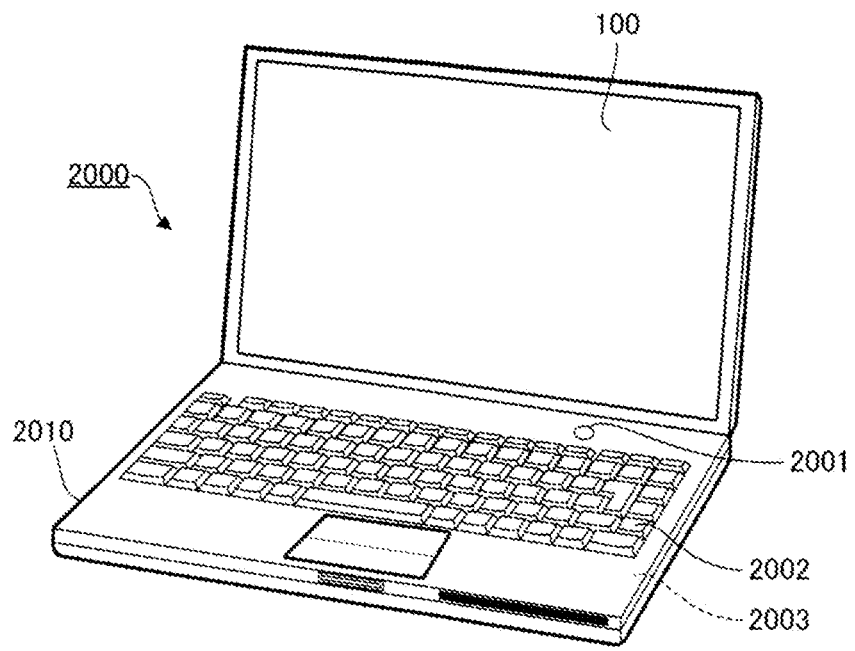
FIG. 21 is a perspective view illustrating a personal computer as an example of an electronic apparatus.

FIG. 21 is a perspective view illustrating a personal computer 2000 as an example of an electronic apparatus. The personal computer 2000 includes the electro-optical device 100 configured to display various images, a main body unit 2010 in which a power source switch 2001 and a keyboard 2002 are installed, and a control unit 2003. The control unit 2003 includes, for example, a processor and a memory, and controls an operation of the electro-optical device 100. In the personal computer 2000, the electro-optical device 100A may be used in place of the electro-optical device 100.

Figure 22:
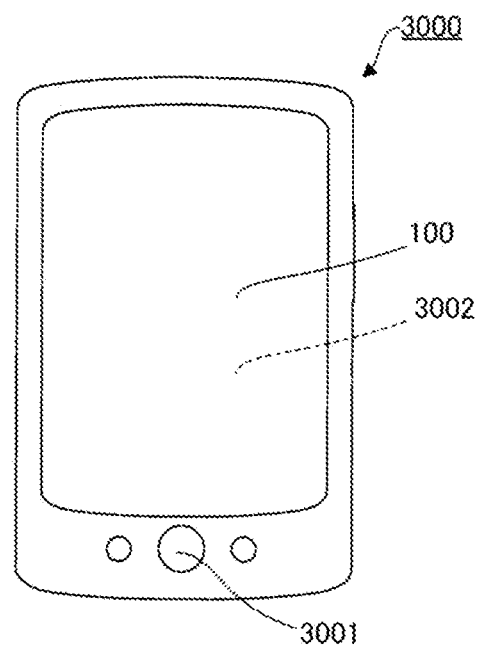
FIG. 22 is a plan view illustrating a smart phone as an example of an electronic apparatus.

FIG. 22 is a plan view illustrating a smart phone 3000 as an example of an electronic apparatus. The smart phone 3000 includes an operation button 3001, the electro-optical device 100 configured to display various images, and a control unit 3002. In accordance with an operation of the operation button 3001, a screen content displayed by the electro-optical device 100 is changed. The control unit 3002 includes, for example, a processor and a memory, and controls an operation of the electro-optical device 100. In the smart phone 3000, the electro-optical device 100A may be used in place of the electro-optical device 100.

Figure 23:
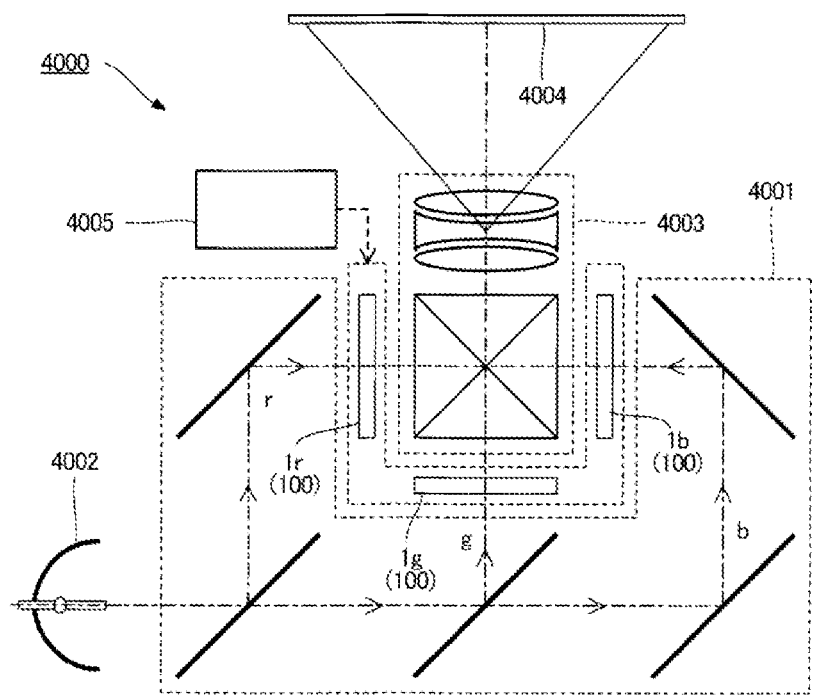
FIG. 23 is a schematic diagram illustrating a projector as an example of an electronic apparatus.

FIG. 23 is a schematic diagram illustrating a projector as an example of an electronic apparatus. The projection-type display apparatus 4000 is a three-plate type projector, for example. An electro-optical device 1r is an electro-optical device 100 corresponding to a red display color, an electro-optical device 1g is an electro-optical device 100 corresponding to a green display color, and an electro-optical device 1b is an electro-optical device 100 corresponding to a blue display color. Specifically, the projection-type display apparatus 4000 includes three electro-optical devices 1r, 1g, and 1b that respectively correspond to display colors of red, green, and blue. The control unit 4005 includes, for example, a processor and a memory, and controls an operation of the electro-optical device 100.

An illumination optical system 4001 supplies a red element r of light emitted from an illumination device 4002 as a light source to the electro-optical device 1r, a green element g of the light to the electro-optical device 1g, and a blue element b of the light to the electro-optical device 1b. Each of the electro-optical devices 1r, 1g, and 1b functions as an optical modulator, such as a light bulb, that modulates respective rays of the monochromatic light supplied from the illumination optical system 4001 depending on display images. A projection optical system 4003 combines the rays of the light emitted from each of the electro-optical devices 1r, 1g, and 1b to project the combined light to a projection surface 4004.

Note that, in the projection-type display apparatus 4000, the electro-optical device 100A may be used in place of the electro-optical device 100.

FIG. 24 is a schematic diagram illustrating a projector as an example of an electronic apparatus. The projection-type display apparatus 5000 is a single plate type projector, for example.

The projection-type display apparatus 5000 includes an illumination device 5002, a lens 5003, dichroic mirrors 5001r, 5001g, and 5001b, the electro-optical device 100A, a projection optical system 5004, a screen 5005, and a control unit 5001.

The illumination device 5002 is a light source configured to emit white light. The lens 5003 is, for example, a condensing lens, and turns the white light into parallel light. The dichroic mirrors 5001r, 5001g, or 5001b reflects light in wavelength regions corresponding to red, green, and blue, respectively, and causes the light in the respective wavelength regions to pass therethrough. Specifically, the light in the wavelength region corresponding to red is reflected by the dichroic mirror 5001r. Moreover, the light in the wavelength region corresponding to red enters the electro-optical device 100A. The light in the wavelength region corresponding to green passes through the dichroic mirror 5001r, is reflected by the dichroic mirror 5001g, and then passes through the dichroic mirror 5001r again. Moreover, the light in the wavelength region corresponding to green enters the electro-optical device 100A at an angle different from that of the light in the wavelength region corresponding to red described above. Further, the light in the wavelength region corresponding to blue passes through the dichroic mirrors 5001r and 5001g, is reflected by the dichroic mirror 5001b, and then passes through the dichroic mirrors 5001r and 5001g again. Moreover, the light in the wavelength region corresponding to blue enters the electro-optical device 100A at an angle different from that of the light in the wavelength region corresponding to red and the light in the wavelength region corresponding to green described above.

The electro-optical device 100A functions as an optical modulator, such as a light bulb, that modulates respective rays of the monochromatic light, depending on display images. The light emitted from the electro-optical device 100A passes through the projection optical system 5004, and is projected on a projection surface included in the screen 5005. Further, the control unit 5001 includes, for example, a processor and a memory, and controls an operation of the electro-optical device 100A.

Note that, in the projection-type display apparatus 5000, the electro-optical device 100A may be used in place of the electro-optical device 100.

The electronic apparatus described above includes the electro-optical device 100 or 100A, the control unit 2003, 3002, or 4005. The electro-optical device 100 and 100A described above are excellent in a light shielding property with respect to the transistor 23 and the like. Thus, display quality of the personal computer 2000, the smart phone 3000, the projection-type display apparatus 4000, or the projection-type display apparatus 5000 can be improved.

Note that the electronic apparatus to which the electro-optical device according to the present disclosure is applied is not limited to the apparatuses given as examples, and examples of the electronic apparatus includes a personal digital assistant (PDA), a digital camera, a television, a video camera, a car navigation device, a display device for in-vehicle use, an electronic organizer, an electronic paper, an electronic calculator, a word processor, a workstation, a visual telephone, a point-of-sales (POS) terminal, and the like. Further, examples of the electronic apparatus to which the present disclosure is applied include an apparatus including a printer, a scanner, a copier, a video player, or a touch panel.

The present disclosure is described above based on the preferred exemplary embodiments, but the present disclosure is not limited to the exemplary embodiments described above. In addition, the configuration of each component of the present disclosure may be replaced with any freely-selected configuration that exerts the equivalent functions of the exemplary embodiments described above, and any freely-selected configuration may be added thereto. Further, the exemplary embodiments described above may be suitably combined to an extent that the exemplary embodiments do not contradict each other. For example, the first exemplary embodiment and the third exemplary embodiment may be combined, and the second exemplary embodiment and the third exemplary embodiment may be combined.

Further, in the description given above, the liquid crystal device is given as an example of the electro-optical device according to the present disclosure. However, the electro-optical device according to the present disclosure is not limited thereto. For example, the electro-optical device according to the present disclosure can be applied to an image sensor and the like. Further, for example, the present disclosure can be applied to a display panel using a light emitting element such as organic electro luminescence (EL), inorganic EL, and light emitting polymer, similarly to the exemplary embodiments described above. Further, the present disclosure can be applied to an electrophoretic display panel using micro capsules each including colored liquid and white particles distributed in the liquid, similarly to the exemplary embodiments described above.

What is claimed is:

1. An electro-optical device including a display region and a peripheral region positioned outside of the display region in plan view, the electro-optical device comprising:
    a first substrate including
        a pixel electrode being disposed in the display region, and
        a transistor being disposed in the display region and being electrically coupled to the pixel electrode;
    a second substrate including a common electrode; and
    an electro-optical layer being arranged between the pixel electrode and the common electrode, wherein
    the first substrate or the second substrate includes
    a first layer having translucency and an insulating property,
    a second layer having translucency and an insulating property, being in contact with the first layer, and
    a light shielding film being arranged between the first layer and the second layer and including tungsten, and
    the light shielding film includes a concave surface being in contact with the second layer,
    wherein
    the light shielding film is present at the first substrate,
    the first substrate further includes a wiring line being coupled to a circuit and a contact portion coupling the wiring line and the light shielding film to each other, and
    the transistor includes a gate electrode being coupled to the wiring line and a semiconductor layer being arranged between the wiring line and the light shielding film.

2. An electronic apparatus, comprising:
    the electro-optical device according to claim 1; and
    a control unit configured to control an operation of the electro-optical device.

3. An electro-optical device including a display region and a peripheral region positioned outside of the display region in plan view, the electro-optical device comprising:
    a first substrate including
        a pixel electrode being disposed in the display region, and
        a transistor being disposed in the display region and being electrically coupled to the pixel electrode;
    a second substrate including a common electrode; and
    an electro-optical layer being arranged between the pixel electrode and the common electrode, wherein
    the first substrate or the second substrate includes
    a first layer having translucency and an insulating property,
    a second layer having translucency and an insulating property, being in contact with the first layer, and
    a light shielding film being arranged between the first layer and the second layer and including tungsten, and
    the light shielding film includes a concave surface being in contact with the second layer,
    wherein
    the light shielding film includes a first light shielding film including a first concave surface being in contact with the second layer and a second light shielding film including a second concave surface being in contact with the second layer,
    the first light shielding film is disposed in the display region,
    the second light shielding film is disposed in the peripheral region, and
    a depth of the first concave surface and a depth of the second concave surface are different from each other.

4. The electro-optical device according to claim 3, wherein
    the depth of the first concave surface is smaller than the depth of the second concave surface.

5. The electro-optical device according to claim 3, wherein
    the depth of the first concave surface is greater than the depth of the second concave surface.

6. The electro-optical device according to claim 3, wherein
    an area of the first light shielding film in plan view and an area of the second light shielding film in plan view are different from each other.

7. The electro-optical device according to claim 6, wherein
    the area of the first light shielding film in plan view is smaller than the area of the second light shielding film in plan view and
    a thickness of the first light shielding film is greater than a thickness of the second light shielding film.

8. The electro-optical device according to claim 6, wherein
    the area of the first light shielding film in plan view is larger than the area of the second light shielding film in plan view and
    a thickness of the first light shielding film is smaller than a thickness of the second light shielding film.

9. The electro-optical device according to claim 3, wherein
    the first layer includes a first recessed portion in which the first light shielding film is arranged and a second recessed portion in which the second light shielding film is arranged.

10. The electro-optical device according to claim 9, wherein each of the first recessed portion and the second recessed portion includes a bottom surface including a step.

11. An electro-optical device including a display region and a peripheral region positioned outside of the display region in plan view, the electro-optical device comprising:
a first substrate including
a pixel electrode being disposed in the display region, and
a transistor being disposed in the display region and being electrically coupled to the pixel electrode;
a second substrate including a common electrode; and
an electro-optical layer being arranged between the pixel electrode and the common electrode, wherein
the first substrate or the second substrate includes
a first layer having translucency and an insulating property,
a second layer having translucency and an insulating property, being in contact with the first layer, and
a light shielding film being arranged between the first layer and the second layer and including tungsten, and
the light shielding film includes a concave surface being in contact with the second layer,
wherein
the light shielding film includes a third light shielding film including a third concave surface being in contact with the second layer and a fourth light shielding film including a fourth concave surface being in contact with the second layer,
each of the third light shielding film and the fourth light shielding film is disposed in the peripheral region,
an area of the third light shielding film in plan view and an area of the fourth light shielding film in plan view are different from each other, and
a depth of the third concave surface and a depth of the fourth concave surface are different from each other.

12. The electro-optical device according to claim 11, wherein
the first layer includes a third recessed portion in which the third light shielding film is arranged and a fourth recessed portion in which the fourth light shielding film is arranged.

13. The electro-optical device according to claim 12, wherein
each of the third recessed portion and the fourth recessed portion includes a bottom surface including a step.

14. An electro-optical device including a display region and a peripheral region positioned outside of the display region in plan view, the electro-optical device comprising:
a first substrate including
a pixel electrode being disposed in the display region, and
a transistor being disposed in the display region and being electrically coupled to the pixel electrode;
a second substrate including a common electrode; and
an electro-optical layer being arranged between the pixel electrode and the common electrode, wherein
the first substrate or the second substrate includes
a first layer having translucency and an insulating property,
a second layer having translucency and an insulating property, being in contact with the first layer, and
a light shielding film being arranged between the first layer and the second layer and including tungsten, and
the light shielding film includes a concave surface being in contact with the second layer,
wherein
the light shielding film includes a fifth light shielding film including a fifth concave surface being in contact with the second layer and a sixth light shielding film including a sixth concave surface being in contact with the second layer,
each of the fifth light shielding film and the sixth light shielding film is disposed in the display region,
an area of the fifth light shielding film in plan view and an area of the sixth light shielding film in plan view are different from each other, and
a depth of the fifth concave surface and a depth of the sixth concave surface are different from each other.

15. The electro-optical device according to claim 14, wherein
the first layer includes a fifth recessed portion in which the fifth light shielding film is arranged and a sixth recessed portion in which the sixth light shielding film is arranged.

16. The electro-optical device according to claim 15, wherein
each of the fifth recessed portion and the sixth recessed portion includes a bottom surface including a step.

* * * * *